US011144935B2

(12) United States Patent
Jumper et al.

(10) Patent No.: US 11,144,935 B2
(45) Date of Patent: Oct. 12, 2021

(54) TECHNIQUE TO AGGREGATE MERCHANT LEVEL INFORMATION FOR USE IN A SUPERVISED LEARNING MODEL TO DETECT RECURRING TRENDS IN CONSUMER TRANSACTIONS

(71) Applicant: Capital One Services, LLC, McLean, VA (US)

(72) Inventors: Daniel Jumper, Carrollton, TX (US); Jeremy Gerstle, San Francisco, CA (US); Olufemi Anthony, Montclair, NJ (US); Jonathan Boroumand, Brooklyn, NY (US); Erik Virbitsky, Washington, DC (US); Michael Walters, Brooklyn, NY (US); Aniver Bosede, Jersey City, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/657,385

(22) Filed: Oct. 18, 2019

(65) Prior Publication Data

US 2021/0117990 A1    Apr. 22, 2021

(51) Int. Cl.
*G06Q 30/00* (2012.01)
*G06Q 30/02* (2012.01)
(Continued)

(52) U.S. Cl.
CPC ......... *G06Q 30/0201* (2013.01); *G06N 20/00* (2019.01); *G06Q 40/12* (2013.12); *G06F 16/285* (2019.01); *G06Q 10/06315* (2013.01)

(58) Field of Classification Search
CPC ............... G06Q 30/0201; G06Q 40/12; G06Q 10/06315; G06N 20/00; G06F 16/285
(Continued)

(56) References Cited

U.S. PATENT DOCUMENTS 10,127,695 B2   11/2018   Garvey et al.
10,148,677 B2   12/2018   Muddu et al.
(Continued)

OTHER PUBLICATIONS

Raschka, Sebastian. "Model Evaluation, Model Selection, and Algorithm Selection in Machine Learning." 2018.

*Primary Examiner* — Hafiz A Kassim
*Assistant Examiner* — Tyrone E Singletary
(74) *Attorney, Agent, or Firm* — Sterne, Kessler, Goldstein & Fox P.L.L.C.

(57) ABSTRACT

A method is disclosed, comprising: aggregating a plurality of sets of transactions, each set of transactions comprising transactions related to an account-merchant pairing; determining variables characterizing a recurrence period based on transaction dates of the transactions in the each set; predicting the recurrence period for a transaction related to the account-merchant pairing for each customer of the plurality of customers; aggregating another set of transactions between the plurality of customers and the merchant; evaluating a distribution of the recurrence period for each customer within range of a distant point; and based on the evaluation of the distribution of the recurrence period for each customer, generating a probability of the merchant having a recurrent transaction with the customer. The account-merchant pairing may comprise a customer account and a merchant of a plurality of customers and merchants. Another set of transactions may comprise transactions in the plurality of sets of transactions.

20 Claims, 6 Drawing Sheets

(51) Int. Cl.
    *G06N 20/00*     (2019.01)
    *G06Q 40/00*     (2012.01)
    *G06Q 10/06*     (2012.01)
    *G06F 16/28*     (2019.01)

(58) Field of Classification Search
    USPC .................................................. 705/7.31
    See application file for complete search history.

(56) References Cited

U.S. PATENT DOCUMENTS

| | | |
|---|---|---|
| 2007/0244741 A1 | 10/2007 | Blume et al. |
| 2009/0132347 A1 | 5/2009 | Anderson et al. |
| 2010/0280927 A1 | 11/2010 | Faith et al. |
| 2012/0022945 A1 | 1/2012 | Falkenborg et al. |
| 2013/0124258 A1* | 5/2013 | Jamal .................. G06Q 30/0201 705/7.29 |
| 2013/0173419 A1 | 7/2013 | Farber et al. |
| 2014/0032333 A1* | 1/2014 | Hemann ................. G06Q 30/02 705/14.68 |
| 2014/0046777 A1 | 2/2014 | Markey et al. |
| 2015/0120383 A1 | 4/2015 | Bennah et al. |
| 2017/0053336 A1 | 2/2017 | Barbour et al. |
| 2017/0236124 A1* | 8/2017 | Wagner .............. G06Q 20/3224 705/44 |
| 2018/0060744 A1 | 3/2018 | Achin et al. |
| 2018/0082325 A1 | 3/2018 | Kitts et al. |
| 2018/0181895 A1* | 6/2018 | Singh ..................... G06Q 40/12 |
| 2018/0197200 A1 | 7/2018 | Zoldi et al. |
| 2018/0240020 A1 | 8/2018 | Madaan et al. |
| 2018/0276541 A1 | 9/2018 | Studnitzer et al. |
| 2018/0350006 A1 | 12/2018 | Agrawal et al. |
| 2019/0073714 A1 | 3/2019 | Fidanza et al. |
| 2019/0102276 A1 | 4/2019 | Dang et al. |
| 2019/0108456 A1 | 4/2019 | Adjaoute |
| 2019/0287094 A1* | 9/2019 | Fisher ................. G06Q 20/354 |
| 2020/0380335 A1 | 12/2020 | Neznal |

\* cited by examiner

TECHNIQUE TO AGGREGATE MERCHANT LEVEL INFORMATION FOR USE IN A SUPERVISED LEARNING MODEL TO DETECT RECURRING TRENDS IN CONSUMER TRANSACTIONS

CROSS-REFERENCE TO RELATED APPLICATIONS

This application hereby incorporates by reference for all purposes U.S. patent application Ser. No. 16/657,394, entitled "A Method for Detecting Recurring Payments or Income in Financial Transaction Data Using Supervised Learning" and filed on Oct. 18, 2019; U.S. patent application Ser. No. 16/657,450, entitled "Incremental Time Window Procedure for Selecting Training Samples for a Supervised Learning Algorithm" and filed on Oct. 18, 2019; and U.S. patent application Ser. No. 16/657,378, entitled "Variable Matching Criteria Defining Training Labels for a Supervised Recurrence Detection" and filed on October 18, 2019 in their entirety. The incorporated matter may be considered to further define any of the functions, methods, and systems described herein.

BACKGROUND

In recent years a huge portion of merchant-customer transactions have been performed using either a credit or debit card issued by a financial institution such as a bank. Even most payments to service providers, such as electricity, gas, TV, cable, are also made using a credit or debit card or via direct debit from the customer's bank account. Many different kind of premium services are offered on subscription basis. If a customer to these services makes a payment using a credit or debit card, a large volume of transactional data is available. One interesting feature than can be identified from analysis of this large volume of transactional data is a recurring relationship of merchants with their customers. An identification of a merchant's recurring relationship can help merchant and customers equally. Based on identification of a merchant's recurring relationship with its customer, the customer can be warned ahead of time for the upcoming payment(s).

Currently, a merchant's recurring relationship with its customers is identified based on analysis of the large volume of transactional data using a conventional mechanism that uses a simple and manually created rule set(s). This affects the accuracy of identification of the merchant's relationship. The simple rule set(s) involves manually defined boundaries on the mean and standard deviation of the set of time differences between consecutive transaction dates. Further, identification of a merchant's recurring relationship with its customers is based on the feedback or input of the customers. The customer is shown a list of their known recurring merchants with an open-ended "Provide Feedback" prompt to solicit feedback/inputs from the customer. Accordingly, a final determination of the merchant's recurring relationship is subject to each customer's interpretation of the question or solicited feedback. Many customers skip any questionnaire that solicits their feedback. As a result, determination of the merchant's recurring relationship may not be as accurate as expected.

BRIEF SUMMARY OF THE INVENTION

Disclosed herein are system, apparatus, device, method and/or computer program product embodiments, and/or combinations and sub-combinations thereof, for aggregating merchant level information for use in a supervised learning model to detect recurring trends.

In an embodiment, a method is disclosed. The method may include steps such as aggregating a plurality of sets of transactions, where each set of transactions may include transactions related to an account-merchant pairing. Based on transaction dates of the transactions in the each set, variables characterizing a recurrence period may be determined. The recurrence period for a transaction related to the account-merchant pairing for each customer of the plurality of customers may also be predicted. Thereafter, another set of transactions between the plurality of customers and the merchant may be aggregated and a distribution of the recurrence period for each customer from a distant point may be evaluated. Based on the evaluation of the distribution of the recurrence period for each customer, a probability of the merchant having a recurrent transaction with the customer may be generated or determined. The account-merchant pairing may include an account of a customer of one or more customers, and a merchant of one or more merchants. Another set of transactions may include transactions in one or more sets of transactions.

The method may further include, for example, splitting each set of the transactions into a first subset of transactions that may be used to determine input features, and a second subset of transactions that may be used to build target label variables. The transactions may be split based on a split date. The first subset of transactions may be used as a training subset. The second subset of transactions may be used as a testing subset. The first subset of transactions may include transactions occurring prior to the split date. The second subset of transactions may include transactions occurring after the split date.

For determining the variables characterizing the recurrence period, a standard deviation of the transaction dates of the transactions in each set, and an average difference between the transaction dates of the transactions in each set may be determined. In addition, a ratio between the standard deviation of the transaction dates and the average difference between the transaction dates may be determined. The standard deviation of the transaction dates, the average difference between the transaction dates, and the ratio of the standard deviation of the transaction dates to the average difference between the transaction dates may be delta variables characterizing the recurrence period.

Further, for determining the variables characterizing the recurrence period, the transaction dates of the transactions in each set of transactions may be converted into ordinal dates. Next, the ordinal dates may be mapped into a phase space, and a mean coordinate based on the mapped ordinal dates may be determined. Next, a vector strength as a distance between (0, 0) coordinate and the mean coordinate may be determined. Additionally, a coverage and redundancy variables may be determined, where the vector strength, the coverage, and the redundancy may be phase variables characterizing the recurrence period. The phase space may represent a billing cycle, the coverage may represent a count of billing cycles in the phase space having at least one transaction, and the redundancy may represent a percentage of billing cycles having more than one transaction. In some embodiments, determining the variables characterizing the recurrence period includes determining a modified vector strength or a scaled vector strength as $$r_{adjusted} = 1 - \frac{2}{\pi}\arccos(r),$$

where $r_{adjusted}$ may be the modified vector strength or the scaled vector strength and r may be the vector strength.

In some embodiments, a Euclidean distance between the distance point and a point representing the vector strength, the coverage, and the redundancy as (the vector strength, the coverage, the redundancy) for phase spaces may be determined. The distance point may be a point that represents the vector strength of value 1, the coverage of value 1, and the redundancy of value 0 as (1,1,0). Based on the Euclidean distance between the distance point and the point representing the vector strength, the coverage, and the redundancy, a probability of the transactions in each set of transactions being transactions of a recurring series may be determined. Each phase space may correspond to one of a weekly, a biweekly, a monthly, a bimonthly, a quarterly, a semi-annually, and a yearly period. For aggregating one or more sets of transactions with the each set of transactions including transactions related to the account-merchant pairing, the transactions may be ordered in a chronological order, and transactions at a beginning and at an end of the chronologically ordered transactions may be discarded within a user specified threshold value.

In another embodiment, a system is disclosed. The system may include a memory for storing instructions, and a processor that is communicatively coupled to the memory. The processor may be configured to execute the stored instructions that may cause the processor to aggregate one or more sets of transactions, where each set of transactions may include transactions related to an account-merchant pairing. The processor may also be configured to determine variables characterizing a recurrence period based on transaction dates of the transactions in the each set, and predict the recurrence period for a transaction related to the account-merchant pairing for each customer of one or more customers. The processor may be configured to aggregate another set of transactions between one or more customers and the merchant, and evaluate a distribution of the recurrence period for each customer from a distant point. Based on the evaluation of the distribution of the recurrence period for each customer, the processor may be configured to generate a probability and a recurrence period of the merchant having a recurrent relationship with the customer. The account-merchant pairing may include an account of a customer of one or more customers and a merchant of one or more merchants. The another set of transactions may include transactions in one or more sets of transactions. The processor may also be configured to split each set of the transactions into a first subset of transactions that may be used to determine input features, and a second subset of transactions that may be used to build target label variables. The transactions may be split based on a split date. Accordingly, the first subset of transactions, occurring prior to the split date, may be used as a training subset. And, the second subset of transactions, occurring after the split date, may be used as a testing subset.

In order to determine the variables characterizing the recurrence period, the processor may be further configured to determine a standard deviation of the transaction dates of the transactions in each set, and an average difference between the transaction dates of the transactions in each set. The processor may also be configured to determine a ratio between the standard deviation of the transaction dates and the average difference between the transaction dates. The standard deviation of the transaction dates, the average difference between the transaction dates, and the ratio of the standard deviation of the transaction dates to the average difference between the transaction dates may be delta variables characterizing the recurrence period.

In order to determine the variables characterizing the recurrence period, the processor may be configured to convert the transactions dates of the transactions in each set of transactions into ordinal dates, and map the ordinal dates into a phase space. The processor may be configured to determine a mean coordinate based on the mapped ordinal dates. The processor may be configured to determine a vector strength as a distance between (0,0) coordinate and the mean coordinate, a coverage, and a redundancy, where the vector strength, the coverage, and the redundancy may be phase variables characterizing the recurrence period. The phase space may represent a billing cycle, the coverage may represent a count of billing cycles in the phase space having at least one transaction, and the redundancy may represent a percentage of billing cycles having more than one transaction. The processor may be configured to determine a modified vector strength or a scaled vector strength as $$r_{adjusted} = 1 - \frac{2}{\pi}\arccos(r),$$

where the $r_{adjusted}$ may be the modified vector strength or the scaled vector strength and r may be the vector strength.

The processor may be further configured to determine a probability of the transactions in each set of transactions for the recurring period based on a Euclidean distance between the distance point and a point representing the vector strength, the coverage, and the redundancy as (the vector strength, the coverage, the redundancy) for phase spaces. The distance point may represent the vector strength of value 1, the coverage of value 1, and the redundancy of value 0 as (1,1,0). Each phase space of the phase spaces may correspond to one of a weekly, a biweekly, a monthly, a bimonthly, a quarterly, a semi-annually, and a yearly period. In order to aggregate, the plurality of sets of transactions with the each set of transactions comprising transactions related to the account-merchant pairing, the processor may be further configured to order the transactions in a chronological order. The processor may be then configured to discard transactions at a beginning and at an end of the chronologically ordered transactions within a user specified threshold value.

In another embodiment, a non-transitory, tangible computer-readable device having instructions stored thereon is disclosed. The instructions when executed by at least one computing device may cause the at least one computing device to perform operations including aggregating one or more sets of transactions, each set of transactions including transactions related to an account-merchant pairing. The operations may also include determining variables characterizing a recurrence period based on transaction dates of the transactions in the each set and predicting the recurrence period for a transaction related to the account-merchant pairing for each customer of one or more customers. The operations may also include aggregating another set of transactions between one or more customers and the merchant, and evaluating a distribution of the recurrence period for each customer from a distant point. Based on the evaluation of the distribution of the recurrence period for each customer, the operations may further include generating a probability of the merchant having a recurrent transaction with the customer and the recurrence period. Based on the generated probability of the merchant, the operations may further include adding the merchant to a whitelist of the merchants. The account-merchant pairing may include an account of a customer of one or more customers and a merchant of one or more merchants. The another set of transactions may include transactions in one or more sets of transactions.

The instructions determining the variables characterizing the recurrence period may include determining a standard deviation of the transaction dates of the transactions in each set, and an average difference between the transaction dates of the transactions in each set. The instructions may also include determining a ratio between the standard deviation of the transaction dates and the average difference between the transaction dates. The standard deviation of the transaction dates, the average difference between the transaction dates, and the ratio of the standard deviation of the transaction dates to the average difference between the transaction dates may be delta variables characterizing the recurrence period.

The instructions for determining the variables characterizing the recurrence period may include ordering the transactions in a chronological order, and discarding transactions at a beginning and at an end of the chronologically ordered transactions within a user specified threshold value. The instructions may also include converting the transactions dates of the transactions in each set of transactions into ordinal dates, and mapping the ordinal dates onto phase spaces. Instructions may also include determining a mean coordinate based on the mapped ordinal dates, and determining a vector strength as a distance between (0, 0) coordinate and the mean coordinate, a coverage, and a redundancy. Each phase space of the phase spaces may correspond to one of a weekly, a biweekly, a monthly, a bimonthly, a quarterly, a semi-annually, and a yearly period. The vector strength, the coverage, and the redundancy may be phase variables characterizing the recurrence period. The phase space may represent a billing cycle, the coverage may represent a count of billing cycles in the phase space having at least one transaction, and the redundancy may represent a percentage of billing cycles having more than one transaction. The instructions determining the variables characterizing the recurrence period may further include determining a modified vector strength or a scaled vector strength as $$r_{adjusted} = 1 - \frac{2}{\pi}\arccos(r),$$

where the $r_{adjusted}$ may be the modified vector strength or the scaled vector strength and r may be the vector strength.

BRIEF DESCRIPTION OF THE DRAWINGS/FIGURES

DETAILED DESCRIPTION OF THE INVENTION

Figure 1:
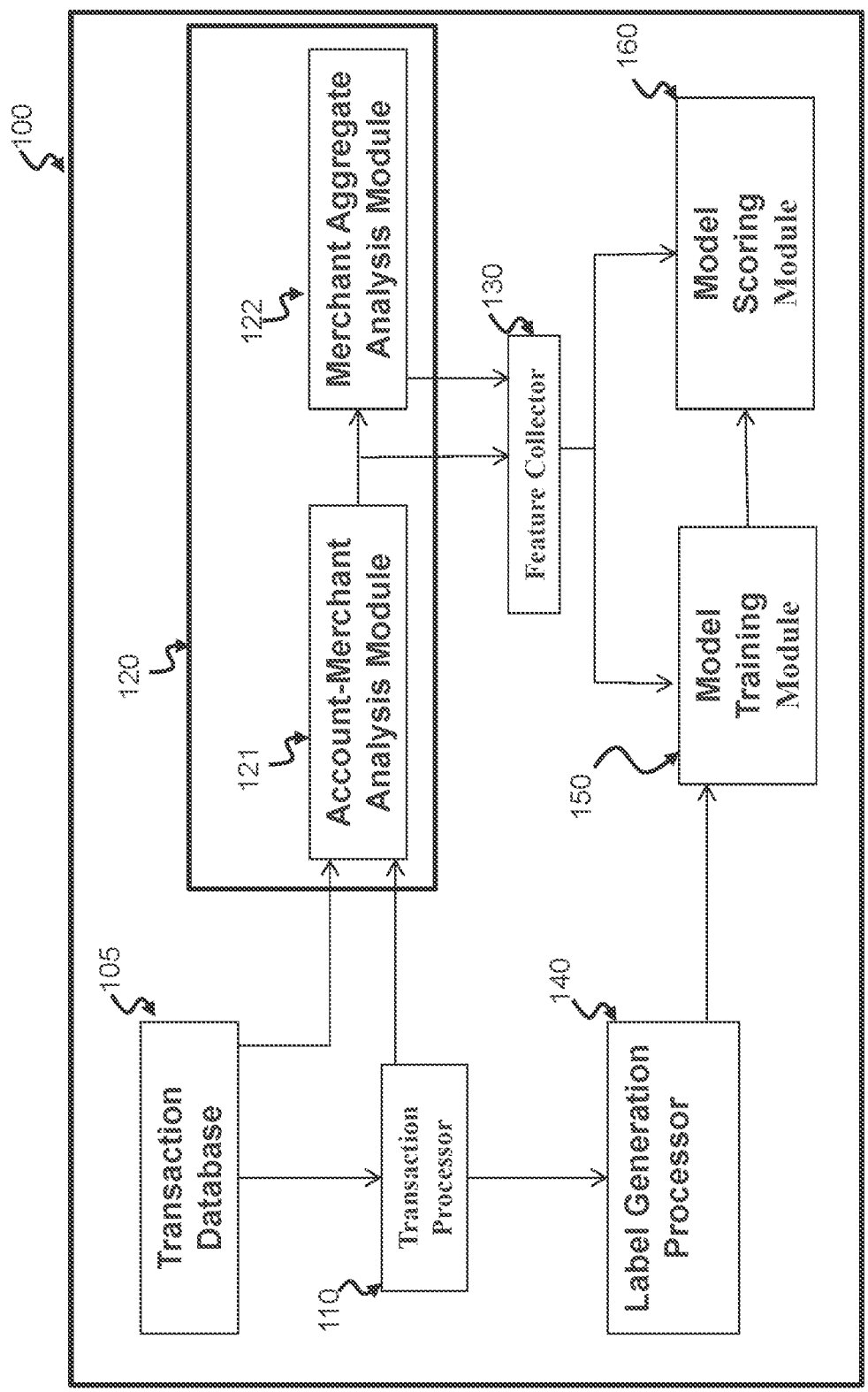
FIG. 1 illustrates system architecture, in accordance with some embodiments.

Provided herein are a method, a system, and a computer program product embodiments, and/or combinations and sub-combinations thereof, for determining whether a merchant's relationship with a customer is recurring or not without relying on feedback or input from the customer. A merchant's recurring relationship is determined automatically and without manually created rule set(s) for analyzing transactions between customers and merchants. Additionally, a prediction of a merchant's recurring relationship with a customer is determined based on a continuous confidence score ranging from zero (0) to one (1) instead of binary True/False (1/0). In other words, a probability of whether a merchant has a recurring relationship with its customer is projected or determined. In one example, instead of projecting the merchant as having a recurring relationship (binary True(1)) or not having recurring relationship (binary False (0)), it may be determined that the merchant is 90% (i.e., confidence score value 0.9) likely to have a recurring relationship, or may be 60% (i.e., confidence score value 0.6) likely to have a recurring relationship.

The Summary and Abstract sections may set forth one or more but not all exemplary embodiments of the present invention as contemplated by the inventor(s), and thus, are not intended to limit the present invention and the appended claims in any way.

An objective of the present application is to identify whether a merchant's relationship with a customer will be recurring based on, for example, whether a transaction between the customer and the merchant is recurring. In accordance with some embodiments, a merchant's relationship with a customer may be considered recurring when transactions between a customer and merchant repeats at a regular cadence over time. Cadence may be considered to be the recurrence period of transactions between the customer and the merchant. The terms cadence and recurrence period are used interchangeably in this disclosure. Examples of the cadence or the recurrence period may be weekly, bi-weekly, monthly, bi-monthly, quarterly, semi-annually, or annually.

In accordance with some embodiments, transactions between a customer and a merchant, between two entities, or specific to a merchant will allow for predictions to be made regarding any future transaction(s) occurring on the next date(s) matching the identified cadence. Accordingly, a merchant's relationship with a customer or customers may be identified as recurring when a set of transactions can be analyzed to identify a cadence, and future transaction(s) may be found occurring at the identified cadence. Based on the disclosure in this application, recurring relationship can be identified between any two entities, for example, an employer and employees, a contractor and subcontractors, etc. The disclosure does not limit its application to the customers and merchants only.

In accordance with some embodiments, a procedure to identify a recurring relationship may include: first, analyzing a set of transactions to identify a cadence within the set;

second, predicting a future transaction date(s) based on the identified cadence; and third, determining if actual transactions can be found at the predicted future transaction date(s), or within a specific threshold number of days of the predicted future transaction date(s). This procedure may be applied over a large set of transactional data without waiting for actual future transactions to evaluate predictions of future transaction date(s). This can be accomplished by using historical data, i.e., transactions that have already occurred between a customer and a merchant. The historical data may be split into two portions, an analysis portion, and a corresponding holdout portion. The analysis portion may include transactions between a customer and a merchant to identify the cadence. While the holdout portion may include transactions between the customer and the merchant to test the prediction of the future transaction date(s). The transactions in the analysis portion may be transactions between the customer and the merchant occurring earlier in time than the transactions in the corresponding holdout portion. For example, the set of transactional data may represent transactions between the customer and the merchant occurring over a one-year period of time. The set of transactional data may be split into an analysis portion that includes transactions from the first eight months and the holdout portion may include transactional data for the last four months. Alternatively, transactions may be split into multiple analysis portions and holdout portions. Because the transactions between a unique merchant-account pair may uncover different pattern that each may help to generate a target label different from the others, splitting transactions into multiple analysis and holdout portion enables training of supervised learning model with more accuracy. For example, transactions between a customer and a merchant for a period starting Jan. 1, 2018 through Dec. 31, 2018 may be split into a first analysis portion that may include transactions from Jan. 1, 2018 through Apr. 30, 2018 and a corresponding holdout portion that may include transactions from May 1, 2018 through Jun. 30, 2018. And, a second analysis portion may include transactions from Jul. 1, 2018 through Oct. 31, 2018 and a corresponding holdout portion may include transactions from Nov. 1, 2018 through Dec. 31, 2018.

Based on the analysis of transactions in the analysis portion, a cadence or a recurrence period may be determined. The cadence may then be used to predict a future transaction date(s). If an actual transaction(s) matching the predicted future transaction date or the predicted future transaction dates are found in the holdout portion corresponding to the analysis portion, then a determination may be made that transactions in the analysis portion are in a recurring series, i.e., having a cadence or a recurrence period. This procedure may be used to generate target labels for training a model as discussed in detail below.

Accordingly, a set of transactions that is determined to be a recurring series is the one that will have predictable future transactions, i.e., transactions that occur at a cadence. After the set of transactions is identified as a recurring series, the set of transactions may be used as part of training a supervised learning model that may be used for more complex and accurate cadence analysis of other sets of transactions.

In accordance with some embodiments, the trained supervised learning model may not only be used for determining a cadence for predicting future transaction date(s). Rather, the supervised learning model may also determine a probability of whether a set of transactional data is one that is (or is not) likely to find a matching transaction in the future if a prediction is made based on the cadence. The cadence over which the set of transactional data may be likely recurring is based on a recurrence period, where the recurrence period may include, for example, weekly, biweekly, monthly, bimonthly, quarterly, semiannually, and/or yearly.

This procedure and its various stages are described in detail below.

Preprocessing

In accordance with some embodiments, during the preprocessing stage, raw transaction data from a set of transactional data may be preprocessed for merchant cleansing, which is described in detail below. The raw transaction data may be an initial input for training a model. The trained model may operate on sets of transactional data over time between individual account-merchant pairs. An account-merchant pair refers to a relationship between a customer and a particular merchant. The transactions in the sets of transactional data may be grouped or aggregated based on a set of columns specifying unique account-merchant pairs. These transaction groups may then form the basis of calculating input features, including account-merchant aggregate features. Input features may also be known as input variables, which are used as part of training a model.

Input Feature Transformations

In accordance with some embodiments, account-merchant aggregate features include basic aggregations based on count of transactions and value aggregations based on a mean and a standard deviation of transaction amounts. Other aggregations may be based on other calculated features that characterize different aspects of the magnitude and rate of a possible recurring trend based on the time pattern of transaction dates. Examples of the other aggregations are the mean and standard deviation of the time differences between each consecutive transaction date ($\overline{\Delta t}$ and $\sigma_{\Delta t}$).

In accordance with some embodiments, the account-merchant aggregate features may be aggregated to create another set of input features known as merchant aggregate features. The merchant aggregate features may indicate transaction trends specific to each merchant. Such transaction trends include merchant level trends that can be a strong indicator of a cadence specific to a merchant and can be independent of a periodic trend in a single set of transactions. For example, when there is only one transaction between a customer and a merchant, e.g., an Internet Service Provider, it is difficult to predict the periodic trend of transactions between the customer and the merchant based on a single transaction. But based on an analysis of the cadence as determined in other sets of transactional data involving the merchant, the single transaction between the customer and the merchant could be identified as likely a recurring transaction because the transaction is with a merchant that generally has a recurring relationship with a customer. Accordingly, the merchant aggregate features may indicate the cadence or the recurrence period associated with the merchant. The merchant aggregate feature may comprise a set of variables that describe the pattern in account-merchant feature values across all accounts for the merchant.

The merchant aggregate features may depend on account-merchant features and may act as an input to a merchant-level aggregation. The merchant-level aggregation may generate metrics that may provide, for example, the percentage of accounts having a monthly recurring relationship with this merchant, etc.

Target Label Generations

Target label generation generates training labels or target labels which are used as part of training a classification model. In accordance with some embodiments, the target label generation process may start with splitting historical transactions between a customer and a merchant into an analysis portion and a holdout portion. The historical transactions are transactions that occurred between the customer and the merchant. The historical transactions may be transactions stored in a database. The account-merchant aggregate features may be computed based on transactions in the analysis portion. Subsequently, based on the account-merchant aggregate features, the recurrence period or the cadence in the transaction set may be determined. The recurrence period or cadence may then be used to predict transaction date(s) of future transaction(s). The predicted future transaction date(s) is after a chronologically last transaction date in the analysis portion. Next, transaction(s) matching the predicted future transaction date(s) is searched in the holdout portion. A target label may then be generated based on the search result. As an example, when an actual transaction with the predicted future transaction date is found in the holdout portion of transactions then transactions in the analysis portion may be labeled as transactions of a recurring series. Otherwise, the transactions may be labeled as transactions of a non-recurring series.

In accordance with some embodiments, transactions in the analysis portion may be labeled as transactions of a recurring series when a transaction(s) in the holdout portion can be found within a threshold number of days of the predicted future transaction date(s). For example, if a future transaction date is predicted in Apr. 10, 2019, and the threshold number of days is set to +/−3 days, then if a transaction with a transaction date between Apr. 7, 2019 through Apr. 13, 2019 can be found in the holdout portion, the transactions in the analysis portion may be labeled as transactions of a recurring series. Transactions in the analysis portion may be labeled as transactions of a recurring series when the prediction of future transaction dates above a specific threshold percentage comes true. For example, if the specific threshold percentage is set to 80%, then if transactions matching eight of the ten predicted future transactions dates are found in the holdout portion, then transactions in the analysis portion may be labeled as transactions of a recurring series. However, if only seven of the ten predicted future transactions dates are found in the holdout portion, then transactions in the analysis portion may not be labeled as transactions of a recurring series.

To give an example of the above-discussed procedure and its phases, for example, a merchant, which is an Internet Service Provider, would have many of its customers making payments for their subscribed services at a regular time period, for example, monthly. Based on analysis of transactions for each customer and the Internet Service Provider, as described above, by splitting transactions into an analysis portion and a holdout portion, it can be determined that the Internet Service Provider almost 90% of the time has a monthly recurring relationship with its customers. There may be a few customers who drop or disconnect services such that there are not enough transactions to determine a recurrency relationship, or their payment history does not support a pattern for monthly recurring relationship. Accordingly, while analyzing transactions between a new customer and the Internet Service Provider, it can be predicted that the relationship of the new customer with the Internet Service Provider is likely going to be a recurring relationship at the monthly recurrence period.

Model Execution Pipelines

The flow of steps described above can be divided into three distinct pipelines with three distinct outputs. The three distinct model execution pipelines are a Merchant Aggregation Pipeline, a Model Training Pipeline, and a Model Scoring/Evaluation Pipeline. These pipelines are discussed in detail below.

Merchant Aggregation Pipeline

In accordance with some embodiments, all three pipelines, including the Merchant Aggregation Pipeline, may start with determining the account-merchant features/variables. An output of the Merchant Aggregation Pipeline may be used as an input to the Model Training Pipeline and the Model Scoring/Evaluation Pipeline. The Merchant Aggregation Pipeline may determine features based on the account-merchant feature results from a complete transactional data set related to a particular account and merchant pair. Utilizing a complete transactional data set increases the accuracy of the analysis since it provides all available information associated with the merchants. In accordance with some embodiments, a subset of the complete transaction data set may be utilized such as transactions from a particular time period within the complete transactional data set. An example of the particular time period may be a more recent time period, which would bias the analysis toward the more recent past. The output of the Merchant Aggregation Pipeline may be a table with a row for each merchant present in the transactions and columns corresponding to various merchant aggregate features.

In accordance with some embodiments, the account-merchant input variables may be determined over two different levels of transaction aggregation. The first level of transaction aggregation may be over the set of transactions in the unique account and merchant pairs. The second level of transaction aggregation may be an aggregation of the results from the first aggregation, e.g., further aggregation at the merchant level over all accounts. In accordance with some embodiments, further aggregation at the merchant over all accounts may be based on common features among various customers, such as, geographic region, language, ethnicity, etc. Each merchant may be uniquely identified based on any combination of merchant's name; merchant's category code; merchant's postal code; merchant's country, state, and city; etc. Similarly, each customer may be uniquely identified based on the customer's account identifier; customer's first name; customer's last name, etc. Accordingly, any combination of fields uniquely identifying a customer and merchant may form a key to aggregate transactions for a unique account-merchant pair.

In accordance with some embodiments, a core set of model input features may be calculated over groups of transactions between unique account-merchant pairs. The core set of model input features may be divided into three groups: basic aggregations variables, cadence analysis variables, and the closest period variables, each of which is discussed in more detail below.

Basic Aggregation Variables

In accordance with some embodiments, input variables of a basic aggregation group may be determined based on the transactions aggregated for each unique account-merchant pair. Input variables in the basic aggregation group may include, for example, a count of the number of transactions in the transactions set (num_trxns), the number of days between the earliest and the latest transaction in the transaction set being analyzed (series_length_days), the mean of the transaction amounts (amt_mean), the standard deviation of the transaction amounts (amt_std), or the ratio of the standard deviation to the mean of the transaction amounts (amt_ratio).

In accordance with some embodiments, transactions within a certain top and bottom range such as transactions having transaction amounts within a certain threshold, e.g., 5%, of the highest and lowest transaction amounts may be discarded before aggregating. Such trimmed calculation provides for more robustness against behavior such as missed/late payments, or stray out-of-time transactions not associated with the steady recurrence. Though any of these examples may result in a small number of much larger or smaller delta t ($\Delta t$) values, which are based on the series of date differences between consecutive transactions and discussed below in detail. If the series is truly recurring aside from these aberrations, the outlier values will be ignored by these trimmed variables.

In accordance with another embodiment, the trimmed variables may not be calculated for series with a small number of $\Delta t$s because a single $\Delta t$ may represent too much of a percentage of the series to trim. Accordingly, when the transactions are trimmed, additional variables may be generated which may include, for example, the mean of the trimmed transaction amounts (trimmed_amt_mean), the standard deviation of the trimmed transaction amounts (trimmed_amt_std), and the ratio of the mean and the standard deviations of the trimmed transaction amounts (trimmed_amt_ratio).

Cadence Analysis Variables

In accordance with some embodiments, input variables of the Merchant Aggregation Pipeline may also include cadence analysis variables. The cadence analysis variables may identify a merchant's relationship with a customer as recurring and a cadence.

The cadence analysis may be performed on aggregated transactions based on a unique account and merchant pair. As discussed above, the aggregated transactions may be split into an analysis portion and a holdout portion based on different criteria as described in more detail in the related application entitled "Incremental Time Window Procedure for Selecting Training Samples for a Supervised Learning Algorithm," which is hereby incorporated by reference.

In accordance with some embodiments, the transactions in the analysis portions may be used to determine cadence analysis variables to determine the cadence present in the set of transactions. The cadence analysis variables may be either delta t ($\Delta t$) variables or phase variables characterizing cadence.

Cadence Analysis Variables: Delta t ($\Delta t$) Variables

In accordance with some embodiments, delta t ($\Delta t$) variables may be determined based on the series of date differences between consecutive transactions. For example, in a series of transactions with transaction date $d_1, d_2, \ldots d_i$, $\Delta t$ may be calculated as $\Delta t = [(d_2-d_1),(d_3-d_2), \ldots (d_i-d_{i-1})]$. Other variables such as $\Delta t$ mean (mean of the $\Delta t$ series), $\Delta t$ std (standard deviation of the $\Delta t$ series), and the $\Delta t$ ratio (the ratio of $\Delta t$ std to $\Delta t$ mean) may be calculated. Transactions from the beginning and end portion of the chronologically ordered transactions of the transaction series may be trimmed or discarded to reduce the influence of statistical outliers. Accordingly, when the transactions are trimmed, trimmed delta t ($\Delta t$) variables may be calculated as trimmed $\Delta t$ mean (mean of the trimmed $\Delta t$ series), trimmed $\Delta t$ std (standard deviation of the trimmed $\Delta t$ series), and the trimmed $\Delta t$ ratio (the ratio of trimmed $\Delta t$ std to trimmed $\Delta t$ mean).

Cadence Analysis Variables: Phase Variables

In accordance with some embodiments, phase variables may be determined based on a mapping of transaction dates into phase space, which is a circular projection of a recurrence period or a billing cycle. The mapping of transactions into the phase space may be achieved by converting a transaction date of each transaction in the series of transactions into a transaction ordinal date (i.e., an integer value representing a number of days since an arbitrary "epoch" point). The phase space represents a cadence, which may also be considered a billing cycle, which may be, for example, weekly, biweekly, monthly, semi-monthly, quarterly, semi-annually, and/or yearly. Transaction ordinal dates may then be transformed into a phase angle in radians with respect to the chosen billing cycle. As the transaction ordinal dates are plotted on a circular projection representing the phase space, a tight cluster of transaction ordinal dates may indicate a close alignment of the series cadence with the chosen billing cycle or phase space. Three different phase variables may capture this qualitative indicator or alignment of the series cadence with the chosen billing cycle or phase space. These phase variables are a vector strength (or strength), a coverage, and a redundancy.

The phase variable vector strength captures how strongly clustered a set of events or transaction ordinal dates are in specific phase space or billing cycle. For example, all transaction ordinal dates of total N number of transactions may first be plotted on a circular projection of the chosen phase space or billing cycle. Accordingly, each transaction ordinal date will have a phase angle $\theta$. Various coordinate points associated with the transaction ordinal dates may then be averaged to determine a mean (x, y) coordinate of all the resulting points on the unit circle of the chosen phase space. A magnitude of a vector pointing from a point (0, 0) to the mean (x, y) coordinate is the vector strength. The vector strength r may be represented as $$r = \frac{1}{N}\sqrt{(\Sigma_i \cos\theta_i)^2 + (\Sigma_i \sin\theta_i)^2},$$

where $\theta_i$ represents a phase angle of transaction i, and N represents a total number of transactions. In this disclosure, the phase variable vector strength and strength may be used interchangeably.

In accordance with some embodiments, the vector strength may range in value between 0 and 1. Transactions that are perfectly recurring at the same cadence or recurrence period as the chosen period of the phase space projection would have a vector strength of value 1. A strongly random series of transactions, e.g., one transaction every day, would have a vector strength of value 0 when projected on to a phase space of a period larger than one week. Accordingly, a vector strength of value 1 could represent a series that has a close periodic alignment with the chosen period or billing cycle of the phase space projection, and a vector strength of value 0 could represent poor alignment with the chosen period or billing cycle or no periodicity.

While the magnitude of the mean (x, y) vector is the vector strength, a phase angle of the mean (x, y) coordinate is a mean phase angle of the transactions in the transaction series/set. The difference between the mean phase angle of the transactions and the phase angle of the chronologically last transaction may be known as a last phase offset. The last phase offset is thus a secondary variable related to the vector strength. The last phase offset may be used to determine the closest period variable.

In accordance with some embodiments, an adjusted vector strength or scaled vector strength may also be generated. Normal vector strength calculation may result in a higher concentration of values close to 1. Because the vector strength for a pair of two vectors varies non-linearly (proportional to a cosine function) with only a small drop in strength value for changes in angle close to zero, and a large drop in value with the same change in angle at larger angles, vector strength is less sensitive to changes when the vector strength is large than when it is small. In order to increase the sensitivity in the large strength value range, the adjusted (scaled) vector strength $r_{adjusted}$ may be calculated $$r_{adjusted} = 1 - \frac{2}{\pi} \arccos(r).$$

The adjusted (scaled) vector strength $r_{adjusted}$ has a range of values between 0 and 1, but there is a lower concentration of values close to 1 because of this scaling.

The vector strength may be insensitive to projection onto a chosen phase space or billing cycle that is a multiple of the true period of the series. For example, a truly monthly recurring series could be projected onto a bimonthly, quarterly, semiannual, or annual phase space and would have a perfect vector strength value of 1. In order to cover this insensitivity, a second primary phase variable called a coverage may be calculated.

In accordance with some embodiments, the coverage may be determined as a number of billing cycles in the phase projection that contains one or more transactions. In accordance with yet another embodiment, the coverage may be determined based on the percentage of billing cycles with no transactions as (1—the percentage of billing cycles with no transactions). Accordingly, the phase variable coverage may provide information to which the phase variable vector strength is insensitive.

In accordance with some embodiments, in addition to the vector strength and the coverage characterizing alignment and cases of sparse projection respectively, a third phase variable—a redundancy variable—may also be determined. The redundancy variable may provide sensitivity to dense projections or series with non-periodic noise transactions present in the transactions series. The redundancy variable may be defined as a percentage of billing cycles with more than one transaction. Collectively, the vector strength, the coverage, and the redundancy may capture a robust view of the periodicity of the series of transactions.

In the embodiments discussed above, the transaction ordinal dates are plotted on a phase space of a chosen period or a billing cycle. However, an exact recurrence period of transactions in the series may not be known in advance. Accordingly, in some embodiments, the transactions may be plotted on a phase space of not just a single period, but on a phase space of seven different periods, e.g., weekly (once every 7 days), biweekly (once every 14 days), monthly (once every month), bimonthly (once every other month), quarterly (once every third month), semiannually (once every six months), and yearly (once every year). Accordingly, the final set of phase variables may consist of all twenty-one permutations of the periods listed above, crossed with the list of three phase variables—[strength, coverage, redundancy]. Separately calculated phase variables for separate periods, for example, the phase variables for a phase space of a monthly period—a monthly strength, a monthly coverage, a monthly redundancy—may provide insight into alignment of the set of transactional data over a monthly period, whereas a weekly strength, a weekly coverage, a weekly redundancy may similarly provide insight into alignment of the transactional data over a weekly period. The resulting twenty-one phase variables and their values may be used as input in the merchant aggregation process, and in selecting the most likely period match to the series. Only the three phase variables from the closest match period may be used as an input in the final model for a given transaction series.

Accordingly, when the Internet Service Provider and its customers' transactions are analyzed using the procedure above, first transactions for each customer and the Internet Service Provider are aggregated based on the account-merchant pair. Transactions for each account-merchant pair are then split into two portions—an analysis portion and a holdout portion. Transactions in the analysis portions are then analyzed to determine the recurrence period using phase variables as described above. For each customer, the phase variables are determined for different phase spaces listed above. Accordingly, an insight into the recurrence period for each customer for the merchant may be obtained.

Closest Period Variable

In accordance with some embodiments, a closest period input variable may be structured to predict not a general "is recurring" class probability, but rather the class probability that a given series "is recurring with a specific period X." Therefore, the closest period input variable may provide an estimation of a recurrence period or a cadence that most closely aligns with a given set of transactions based on the calculated cadence analysis variables. As described above, the phase variables, e.g., the vector strength, the coverage, and the redundancy, calculated in different phase spaces each representing a different period, e.g., weekly, monthly, biweekly, bimonthly, quarterly, semiannually, and yearly, capture a view of how closely aligned a series is with that period.

A perfect recurring series will have each consecutive transaction performed after the same exact number of days. For example, a perfect recurring series having a weekly recurrence period will have each transaction performed exactly seven days after the previous transaction. Accordingly, the perfect recurring series will have the strength and the coverage with values of 1 and the redundancy with the value of 0. Accordingly, a point at coordinates (1,1,0) may represent (strength=1, coverage=1, redundancy=0), a perfect and cleanly recurring transaction series. When the phase variables for each different period are calculated, different points representing the strength, the coverage, and the redundancy in three-dimensional space may be obtained. Accordingly, when a Euclidean distance between these seven different points from the ideal point at the coordinates (1,1,0) is calculated and compared, a period having a least Euclidean distance between the point representing the phase variables (the strength, the coverage, and the redundancy) and the ideal point is the period with which the transactions series may be best aligned.

The closest period variable may be subsequently used as the basis for making future transaction predictions in the label generation process. The closest period variable may also be used to determine which phase variables will be used as an input in the final model. For example, if the Euclidean distance between the point representing a monthly strength variable, a monthly coverage variable, and a monthly redundancy variable from the ideal point (1,1,0) is the least, then the closest period's phase variables the monthly strength variable, the monthly coverage variable, and the monthly redundancy variable may be copied to new variables such as a closest strength variable, a closest coverage variable, and a closest redundancy variable. Further, the closest strength variable, the closest coverage variable, and the closest redundancy variable may be used as an input into training the model. Additionally, a time-length of the set of transactions in multiples of the period may be calculated based on the length in days of the set transactions and number of days of the period of the phase space. Thus, the closest period variable allows distinct decision boundaries on a per-period basis.

Merchant Aggregation Variables

An objective of the Merchant Aggregation Pipeline is to capture recurring trends across all accounts at the merchant level in order to calculate recurring predictions for the merchant with a higher confidence and accuracy.

In accordance with some embodiments, a procedure similar to the procedure described in calculating the closest period variable, the cadence analysis phase variables and their distance from the "ideal" points may be used as the basis for aggregating information about merchants. As described above, seven separate three-dimensional phase variable spaces or points, one for each of the seven periods (weekly, monthly, biweekly, bimonthly, quarterly, semiannually, and yearly) for a separate set of these spaces for each merchant may be obtained. After the cadence analysis variables have been calculated for all transaction series, the results may be grouped by a merchant such that there will be a single set of phase variable values for each account's transactions with that merchant. Each account's phase variable values produce a single point in each of the merchant's phase variable spaces. Accordingly, for each merchant, there are seven distribution points in seven 3-dimensional spaces that together represent the merchant's relationship with all of the merchant's customers/accounts.

As described above, the Euclidean distance between the ideal point in phase variable space and the calculated point for that series represents how closely that series is aligned with that period of recurrence. Accordingly, distributions of points clustered closely around a period's ideal point, i.e., having a shortest Euclidean distance, may indicate that the merchant has a strong trend of recurring relationships with the merchant's accounts and the recurrence period. In order to quantify this, a metric that compares not just the distance between two points, but also a distance between a point and a distribution may be required.

In accordance with some embodiments, a metric to compare the ideal point to the mean point of the merchant's distribution may be generated. The metric may form first primary merchant aggregate variables: the Euclidean distance, for each period, between the ideal point and the mean of that merchant's account distribution in phase variable space. The merchant aggregate variable may be called as {period}_merch_edist and may calculate a set of seven values for each period separately. Accordingly, the closest period may be calculated as a closest {period}_merch_edist point from the ideal point of (1,1,0).

Model Training Pipeline

In accordance with some embodiments, the Model Training Pipeline splits input transactions into analysis and holdout portions to determine input feature(s)/variable(s) and generates target label(s)/variable(s) to train one or more models. The Model Training Pipeline may depend on the output provided by the Merchant Aggregation Pipeline, as the merchant aggregate features may be used as input features into the Model Training Pipeline. For example, results from the cadence analysis may be used to predict transaction date(s) of future transactions, i.e., the transactions in the holdout portion.

Further, target labels may be generated based on finding a match based on the predicted transaction date(s) in the holdout portion. Generation of a target label may be dependent on finding a correct match based on tunable matching tolerance thresholds. For example, a threshold may indicate that some percentage, for example 100% or 95%, of predicted transactions are required to be found in the holdout portion. Accordingly, results of the analysis may be condensed into single binary values based on a specific matching criterion for model training, and the resulting target labels that are generated based on the specific matching criteria are used in training different models. The output of the Model Training Pipeline thus is a trained model. The process may be repeated using different matching criteria to generate any number of trained models, each one tuned to reflect the values of the respective matching criteria. Similar to Merchant Aggregation Pipeline, a complete data set, i.e., all available transactions are considered during Model Training Pipeline.

There are two parameters that specify matching criteria: date tolerance and number of predictions. These criteria define labels, and because the labels are used for training models, they inherently define the trained model. As noted above, the trained model scores sets of transactions based on a likelihood that predicted transaction date(s) will find a match (as defined by our matching criteria) in future (or held-out) transactions.

In some embodiments, the date tolerance parameter is the maximum allowed difference between the predicted date and an actual held-out transaction (e.g., +/−1 day, or +/−10% of the cadence or period). As part of the analysis, the closest transaction in the held-out portion to the predicted transaction date is first identified. Then the difference is either days between the actual date of the transaction and the predicted transaction data is used directly, or divided by the average days in the cadence to produce the percentage of the period. If this calculated difference is less than or equal to the value indicated by the date tolerance parameter, then the set of transactions qualifies as having a match. When multiple predicted transaction dates are being made, this parameter may be applied separately for each predicted transaction date.

The date tolerance parameter determines the degree of inconsistency allowed between predicted transaction date(s) and actual transaction dates. It allows for the definition of what constitutes a recurrence period to be tuned between tight and loose a requirement, which subsequently affects the training of the model. For example, a value of 0 would require and exact match between the predicted transaction date and an actual transaction date in the holdout period. As another example, a value of +/−50% of the period would accept essentially any transaction in the holdout set as a match.

Another parameter used in the matching criteria is the number of predictions parameter, which indicates the number of matches that are required in the holdout period. Requiring multiple consecutive matching predictions minimizes the weakness of coincidental matches and increases the confidence in determining whether a set of transactions has a recurrence period.

Another parameter is the allowed missed parameter which allows for some misses out of multiple predictions (e.g., at least 2 out of 3 predictions). This parameter gives an added dimension of tuning—to still require a longer trend over time (reducing coincidence), but allowing inconsistencies such as missed payments.

Model Scoring/Evaluation Pipeline

In accordance with some embodiments, the Model Scoring Pipeline, also known as a Model Evaluation Pipeline, is used to score new incoming series of transactions, once a trained model is available as an output of the Model Training Pipeline. Accordingly, the Model Scoring Pipeline depends on the Model Training Pipeline to produce a trained model object. In addition, the Model Scoring Pipeline takes as input the account-merchant features and uses the merchant aggregate results as described in the Merchant Aggregation Pipeline. The Model Scoring Pipeline may be applied to complete sets of transactional data. In yet another embodiment, the Model Scoring Pipeline may be applied to subsets of the transactional data such as when new transactions are received. For example, the Model Scoring Pipeline may score/evaluate one day's worth of new transactions, where the new transactions may cover only a small subset of unique account/merchant pairs. The full-time history of transactions is considered then only from account-merchant pairs that are found within the small subset (but not historic transactions from any other account/merchant pairs are not in the small subset). Model Scoring Pipeline may provide as output scores specifying recurring probability of the transactions of the new transactions associated with the account-merchant pairs.

In some embodiments, a trained model may score new data as follows: as new transactions are received for an account merchant pairing, the complete set of transactional data associated with that account merchant pairing are gathered and used as input for cadence analysis. In model training, cadence analysis starts by dividing a set of transactional data into analysis and holdout portions as discussed above. However, for model scoring, the set of transactional data is analyzed to produce input feature values. The merchant aggregate results—previously calculated for training—are then queried to find the values matching the merchant for the series in question. New transactions do not always immediately update the merchant aggregate results, but may be included as part of the set of transactional data on a slower periodic basis.

Various embodiments of these features will now be discussed with respect to the corresponding figures.

FIG. 1 is an illustration of system architecture, in accordance with some embodiments. A system 100 shown in FIG. 1 comprises a transaction database 105, a transaction processor 110, an account-merchant analysis module 121, a merchant aggregate analysis module 122, a feature collector 130, a label generation processor 140, a model training module 150, and a model scoring module 160. Although only one element is displayed, it is understood that each module or processor may comprise one or more modules or processors. The account-merchant analysis module 121 and the merchant aggregate analysis module 122 together form an input feature builder module 120.

In accordance with some embodiments, the transaction database 105 holds transactions executed between different customers and merchants. The transaction database 105 may organize the transactions into different sets of transactions that span a period of time. The period of time may be determined based on the purpose of the supervised model. The transaction database 105 may store transactions as raw transactions (without any preprocessing). The transaction database 105 may store the transactions after they have been preprocessed by, for example, filtering the transactions based on the account or performing a merchant name cleansing where the names of merchants are cleansed in to resolve the names of merchants.

Raw transactions in the transaction database 105 may not generally have merchant data that can be used for creating unique account-merchant pairs. This is because the merchant name may generally contain degenerates (a random sequence of characters that are appended to the raw merchant name that represent some foreign identifier). Accordingly, to identify all transactions belonging to a unique account-merchant pair, the raw transactions may be preprocessed for merchant cleansing to group transactions more consistently. In merchant cleansing, various information associated with a merchant, for example, merchant's name, merchant's category code, merchant's address information—zip code, city, state, country—may be used to retrieve a cleansed name for the merchant. Performing preprocessing, such as the cleansed merchant name, allows transactions to be grouped together accurately. Further, the transaction database 105 may be any kind of database such as Spark, Hadoop, or PostgreSQL. The database may be a memory that stores transactions.

An example of a set of transactions illustrating cleansed merchants is shown below in Table 1.

TABLE 1

| Account | Transaction Date | Transaction Amount | Merchant Name | Cleansed Merchant Name |
|---|---|---|---|---|
| 1005117177 | Apr. 4, 2016 | 9.99 | ADY* Internet Service Provider 256680048 | Internet Service Provider |
| 1005117177 | Jul. 4, 2016 | 9.99 | ADY* Internet Service Provider A1K282617 | Internet Service Provider |
| 1005117177 | Aug. 5, 2016 | 9.99 | ADY* Internet Service Provider YTWRQ8162 | Internet Service Provider |
| 1005117177 | Sep. 3, 2016 | 9.99 | ADY* Internet Service Provider 19302Q81U | Internet Service Provider |
| 1005117177 | Oct. 5, 2016 | 9.99 | ADY* Internet Service Provider QT451S896 | Internet Service Provider |
| 1005117177 | Nov. 4, 2016 | 9.99 | ADY* Internet Service Provider VTWEI7156 | Internet Service Provider |

The transaction processor 110 may process the raw transactions or transactions processed via merchant cleansing for splitting the transactions into analysis portion(s) and holdout portion(s). The transactions may span a time period, e.g., one year; the analysis portion may include transactions from subset of the time period, e.g., first 8 months, and is used to identify the cadence, and the holdout portion may include transactions from the remaining subset of the time period, e.g., the remaining 4 months, which may be used to test the predicted transaction date(s). Based on the analysis of transactions in the analysis portion, a transaction(s) occurring in future may be predicted. If an actual transaction on the predicted future transaction date is found in the holdout portion, then transactions in the analysis portion, i.e., the analysis portion, are determined to be in a recurring series. Otherwise, the transactions in the analysis portion are determined to be not in a recurring series. As described above, transactions in the analysis portion may be identified as transactions in a recurring series based on different matching criteria, such as finding transactions within a threshold number of days, e.g., +/−5 days of the predicted transaction dates, or when 80% of the predicted future transactions come true, etc.

In accordance with some embodiments, the account-merchant analysis modules 121 may receive as input either raw or preprocessed transactions from the transaction database 105. The transactions may be preprocessed transactions for merchant cleaning. The transactions received as input at the account-merchant analysis modules 121 may be transactions from the analysis portion only. The account-merchant analysis module 121 may process the received transactions for generating account-merchant input variables or account-merchant input features as part of the Merchant Aggregation Pipeline. The account-merchant input variables form a core set of model input variables determined over a group of transactions between unique account-merchant pairs. The account-merchant input variables or input features are discussed above in detail.

The account-merchant analysis module 121 may further process the aggregated transactions based on a unique account-merchant pair to generate account-merchant input features or account-merchant input variables. The account-merchant input variables form a core set of model input features. The account-merchant input features may be of three different kinds: basic aggregations variables, cadence analysis variables, and the closest period variables.

In accordance with some embodiments, the account-merchant analysis module 121 may generate or determine basic aggregation variables based on the transactions aggregated for each unique account-merchant pair. Basic aggregations variables determined by the account-merchant analysis module 121 may include, for example, the count of the number of transactions in the transactions set (num_trxns), the number of days between the earliest and the latest transaction in the transaction set being analyzed (series_length_days), the mean of the transaction amounts (amt_mean), the standard deviation of the transaction amounts (amt_std), and the ratio of the standard deviation to the mean of the transaction amounts (amt_ratio).

In accordance with some embodiments, the account-merchant analysis module 121 may discard certain transactions to avoid skewing the results of the analysis. For example, the account-merchant analysis module may discard transactions having transaction amounts within 5% of the highest and lowest transaction amounts before aggregating the transactions. As described above, the purpose for this trimmed calculation is to give more robustness against messy behavior such as missed/late payments, or stray out-of-time transactions not associated with the steady recurrence. Based on analysis of the trimmed transaction, the account-merchant analysis module 121 may generate the mean of the trimmed transaction amounts (trimmed_amt_mean), the standard deviation of the trimmed transaction amounts (trimmed_amt_std), and the ratio of the standard deviation to the mean of the trimmed transaction amounts (trimmed_amt_ratio).

In accordance with some embodiments, the account-merchant analysis module 121 may generate cadence analysis variables based on an analysis of the transactions aggregated for each unique account-merchant pair. The cadence analysis variables identify whether a merchant's relationship with a customer is recurring. In cadence analysis, a set of transactions may be analyzed to identify a cadence, and future transactions may be searched occurring at the identified cadence. As described above, the cadence analysis variables are of two kinds: delta t ($\Delta t$) variables and phase variables.

In accordance with some embodiments, the account-merchant analysis module 121 may generate delta t ($\Delta t$) variables based on the series of date differences between consecutive transactions. For example, in a series of transactions with transaction date $d_1, d_2, \ldots d_i$, $\Delta t$ may be calculated as $\Delta t=[(d_2-d_1), (d_3-d_2), \ldots (d_i d_{i-1})])$. Other variables such as the mean of the $\Delta t$ series ($\Delta t$ mean), the standard deviation of the $\Delta t$ series ($\Delta t$ std), and the ratio of the standard deviation to the mean of the $\Delta t$ series ($\Delta t$ ratio) may be determined.

In accordance with yet another embodiment, transactions from the beginning and end portion of the chronologically ordered transactions of the transaction series may be trimmed or discarded to reduce the influence of statistical outliers. Accordingly, when the transactions are trimmed, trimmed delta t ($\Delta t$) variables may be calculated as trimmed $\Delta t$ mean (mean of the trimmed $\Delta t$ series), trimmed $\Delta t$ std (standard deviation of the trimmed $\Delta t$ series), and the trimmed $\Delta t$ ratio (the ratio of trimmed $\Delta t$ std to trimmed $\Delta t$ mean).

In accordance with some embodiments, the account-merchant analysis module 121 may generate phase variables based on a mapping of transaction dates into phase space. As discussed above, these phase variables are vector strength (or strength), coverage, and redundancy.

As described earlier, the phase variable vector strength captures how strongly clustered a set of events or transaction ordinal dates are in specific phase space or billing cycle. The account-merchant analysis module 121 may chart or plot all transaction ordinal dates of total N number of transactions on a circular projection of the chosen phase space or billing cycle. Accordingly, each ordinal transaction date will have a phase angle θ. The coordinate points associated with the transaction ordinal dates are then averaged to determine a mean (x, y) coordinate of all the resulting points on the unit circle of the chosen phase space. The magnitude of a vector pointing from point (0, 0) to the mean (x, y) coordinate is the vector strength. The vector strength r may be represented as $$r = \frac{1}{N}\sqrt{(\Sigma_i \cos\theta_i)^2 + (\Sigma_i \sin\theta_i)^2},$$

where $\theta_i$ represents a phase angle of transaction i, and N represents the total number of transactions.

As described above, the vector strength ranges between 0 and 1. A series that is perfectly recurring at the same period, as the chosen period of phase space projection would have a vector strength of 1. A strongly random series of transactions, e.g., one transaction every day, would have a vector strength value of 0 when projected on to phase space of a period larger than one week. Therefore, the vector strength of value 1 represents a series that has a close periodic alignment with the chosen period or billing cycle of the phase space projection, and the vector strength of value 0 represents poor alignment with the chosen period or billing cycle or no periodicity.

As described above, a magnitude of the mean (x, y) coordinate is the vector strength; a phase angle of the mean (x, y) coordinate is a mean phase angle of the transactions. The difference between the mean phase angle of the transactions and a phase angle of a chronologically last transaction may be known as a last phase offset. The last phase offset is thus a secondary variable related to the vector strength. The last phase offset may be used to determine the closest period.

In accordance with some embodiments, the account-merchant analysis module 121 may also determine an adjusted vector strength, which may also be referred as a scaled vector strength in this disclosure. Normal vector strength calculation may result in a higher concentration of values close to 1. Because the vector strength for a pair of two vectors varies non-linearly (proportional to a cosine function) with only a small drop in strength value for changes in angle close to zero, and a large drop in value with the same change in angle at larger angles, vector strength is less sensitive to changes when the vector strength is large than when it is small. In order to increase the sensitivity in the large strength value range, the adjusted (or scaled) vector strength $r_{adjusted}$ may be calculated as $$r_{adjusted} = 1 - \frac{2}{\pi}\arccos(r).$$

The adjusted (or scaled) vector strength $r_{adjusted}$ may have a value that is between 0 and 1, with a lower concentration of values close to 1 because of this scaling.

In accordance with some embodiments, the account-merchant analysis module 121 may generate the coverage variable. The account-merchant aggregate module 121 may determine the coverage variable as a number of billing cycles in the phase projection that contains one or more transactions. In other words, the coverage may be determined based on the percentage of billing cycles with no transactions. Accordingly, the phase variable coverage may provide the information to which the phase variable vector strength is insensitive.

In accordance with some embodiments, the account-merchant analysis module 121 may generate the redundancy variable. The account-merchant analysis module 121 may determine the redundancy may be determined as the percentage of billing cycles with more than one transaction. As described above, the vector strength, the coverage, and the redundancy together may capture a robust view of the periodicity of a series of transactions and the account-merchant analysis module 121 generates these phase variables for use by other modules/components of the system 100.

In accordance with some embodiments, the account-merchant analysis module 121 may chart or plot ordinal transactions dates on different phase spaces, each phase space of the phase spaces may represent a different period. The period may include, for example, weekly (once every 7 days), biweekly (once every 14 days), monthly (once every month), bimonthly (once every other month), quarterly (once every third month), semiannually (once every six months), and yearly (once every year). Accordingly, the final set of phase variables may consist of all permutations of the different periods listed above. Separately calculated phase variables for separate periods, for example, the monthly strength, the monthly coverage, the monthly redundancy may provide insight into alignment of the series over a monthly period, whereas the weekly strength, the weekly coverage, the weekly redundancy may similarly provide insight into alignment of the series over a weekly period. The resulting phase variables and their values may be used as input in the merchant aggregation process by the merchant aggregate analysis module 122, and in selecting the most likely period match to the series. Only the three variables from the closest match period may be used as an input in the final model for a given transaction series.

In accordance with some embodiments, the account-merchant analysis, module 121 may determine the closest period input variable. The account-merchant analysis, module 121 may determine the closest period input variable that may be used to predict a class probability that a given series "is recurring with a specific period X." The closest period input variable may provide an estimation of what period of recurrence may be most closely aligned with a given series of transactions based on the calculated cadence analysis variables. As described above, there are three phase variables (the strength, the coverage, and the redundancy) calculated for different phase spaces each representing a different period (weekly, monthly, biweekly, bimonthly, quarterly, semiannually, and yearly) capture a view of how closely aligned a series is with that period.

As described above, a perfect and cleanly recurring series will have the strength and the coverage with values of 1 and the redundancy with a value of 0. Accordingly, a point (1,1,0) represents (strength=1, coverage=1, redundancy=0) a perfect and cleanly recurring transaction series. The account-merchant analysis module 121 may determine phase variables for each different period. Accordingly, different points representing the strength, the coverage, and the redundancy in three-dimensional space may be obtained. Next, the account-merchant analysis module 121 may compute a Euclidean distance between these different points from the ideal point (1,1,0) and may determine a period having a least Euclidean distance between the point representing phase variables (the strength, the coverage, and the redundancy) and the ideal point. The period having the least Euclidean distance between the point representing phase variables and the ideal point is the period with which the transactions series is best aligned and the period is the cadence at which the series is recurring.

The input features or input variables generated by the account-merchant analysis module 121 may act as an input to the merchant aggregate analysis module 122. The merchant aggregate analysis module 122 may process the transactions using procedures similar to described above and used by the account-merchant analysis module 121 to determine the closest period variable, the cadence analysis phase variables, and their distance from the "ideal" point. The merchant aggregate analysis module 122 may then aggregate transactions at a merchant level, i.e., transactions of all customers related to each merchant are grouped together. The transactions aggregated at the merchant level may then be processed to determine separate three-dimensional points (representing the vector strength (or strength), the coverage, and the redundancy variable), each three-dimensional point for each of the seven periods (weekly, monthly, biweekly, bimonthly, quarterly, semiannually, and yearly). After the cadence analysis variables have been calculated for all transaction series, the results may be grouped by a merchant such that there will be a single set of phase variable values for each account's transactions with that merchant. Each account's phase variable values produce a single point in each of the merchant's phase variable spaces. Accordingly, for each merchant, there are seven distribution points in seven 3-dimensional spaces that together represent the merchant's relationship with all of the merchant's customers/accounts. The process may be repeated for each merchant.

As described above, the Euclidean distance between the ideal point and the calculated/determined point for that series represents how closely that series is aligned with that recurrence period, and distributions of points clustered closely around a period's ideal point may indicate that the merchant has a strong trend of recurring relationships with the merchant's accounts. In order to quantify this, a metric that compares not just the distance between two points, but also a distance between a point and a distribution may be generated by the merchant aggregate analysis module 122.

In accordance with some embodiments, the merchant aggregate analysis module 122 may generate or determine a metric to compare the ideal point to the mean point of the merchant's distribution. The metric forms the first primary merchant aggregate variables: the Euclidean distance, for each period, between the ideal point and the mean of that merchant's account distribution in phase variable space. The merchant aggregate variable may be called as {period}_merch_edist and calculates the set of seven values for each period separately. Accordingly, the closest period may be calculated as a closest {period}_merch_edist point from the ideal point of (1,1,0). As described above, period may include, for example, weekly, biweekly, monthly, bimonthly, quarterly, semi-annually, and yearly.

The input features or input variables generated by the merchant aggregate analysis module 122 and the account-merchant analysis module may be collected by the feature collector 130 to channel as input to the model training module 150 and the model scoring module 160.

In accordance with some embodiments, the label generation processor 140 may generate labels that are used for training a classification model. Accordingly, the label generation processor 140 may also be referenced as a target label generation processor 140 in this disclosure. The labels from the label generation processor 140 may be provided as input to the training module 150. The label generation processor 140 may split the historical account-merchant groups of transactions into an analysis portion and a holdout portion. How the label generation processor 140 splits transactions directly influence the results of the analysis. If a different date boundary is used to split a set of transactions into analysis and holdout portions, different input and target variable values will be calculated. A single set of transactions may be used to generate multiple sets of transactions by virtue of selecting different split dates and each of these sets of transactions may be used to generate different labels. In other words, a single set of transactions can result in multiple different instances in the final training sample—each representing a different span of time analyzed to produce input/target variables.

As an example, a set of transactions may span a time period (e.g., a year). This set may be used to generate a first analysis portion that has a subset of that time period (e.g., two months such as January, February), a second analysis portion that another subset (e.g., three months), and a third analysis portion having another subset (e.g., four months). Consequently, the holdout portion would include transaction of the remaining subset of the time period (e.g., ten months, nine months, and eight months, respectively).

The label generation processor 140 may also compute the account-merchant aggregate features for transactions in the analysis portion. The label generation processor 140 may determine the recurrence period or the cadence that might be present in the transaction set based on the account-merchant features. The recurrence period or cadence may then be used to predict the next transaction date(s) that would take place after the transaction date of the chronologically last transaction in the analysis portion. The label generation processor 140 may determine a predicted transaction date by adding the recurrence period (e.g., a week, a month) to the transaction date of the chronologically last transaction in the set of transactions. Additional predicted transaction dates may be calculated by iteratively adding the recurrence period to the previous predicted transaction date.

Next, the label generation processor 140 may compare the predicted transaction date(s) against actual transaction date(s) of transaction(s) in the holdout portion. The target label may then be generated as a result of whether a matching transaction is found corresponding to the predicted transaction date in the holdout portion. When it is determined that a transaction exists with the predicted transaction date or within a threshold number of days of the predicted transaction date, the label generation processor 140 may label the transactions in the analysis portion as transactions in a recurring series. Otherwise, the label generation processor 140 may label the transactions in the analysis portion as transactions in a non-recurring series.

As noted above, two parameters involved in the matching criteria include date tolerance and number of predictions. The values for these parameters may be updated manually or dynamically to meet the scenarios needed. The label generation processor 140 utilizes the values for these parameters in determining whether a match exists between predicted transaction date(s) and actual date(s) of transactions within the holdout portion. Examples of the scenarios include a trained model for providing general predictions that sets of transactions are recurring and a trained model for providing prediction of transaction date(s) that is more accurate. Examples of how these parameters for matching criteria are utilized are now discussed.

As one example, the number of predictions variable may be set to "1" and a date tolerance variable may be set to "+/−3 days." At a high level, these parameters would provide loose criteria that allow some variation in matching the predicted transaction date to the actual dates while still being successful at identifying long-term trends. That is, the date tolerance variable allows an actual date to be within 3 days of the predicted transaction date and the number of predictions variable indicates only one actual transaction date needs to be matched within the holdout portion. The label generation processor 140 generates a label based on determined matches in accordance with these parameters.

Changes to the parameters affect whether a match is determined and consequently influence the labels generated by the label generation processor 140. For example, changing the number of predictions variable to "3" would require finding three actual transaction dates within the holdout portion. Requiring 3 actual transaction dates is stricter and generating labels for this criteria requires a longer hold-out time period. As another example, the date tolerance variable may be set to "+/−1 day" which also is stricter as actual transaction dates can only vary by one day from the predicted transaction date.

Labels generated by the label generation processor 140 are therefore directly impacted by these matching criteria. The reason to tune the matching criteria is to label specific types of sets of transactions as being recurring. For example, if a trained model to determine a comprehensive list of recurring relationships needs to be as inclusive as possible. Accordingly, some degree of inconsistency in a recurring series is acceptable. Adjusting the matching criteria allows the label generation processor 140 to generate labels that identify more sets of transactions as being recurring. On the other hand, as another example, a trained model for detecting a single possible "upcoming recurring charge alert" would require the label generation processor 140 to generate a label for a specific set of transactions, i.e., an alert that is very specific and accurate. For this trained model, the label generation processor 140 would require stricter matching criteria that let the trained model focus on high scores based specifically on the tight consistency of the transactions.

In accordance with some embodiments, the model training module 150 takes the target labels generated by the target label generation processor 140, input features generated by the account-merchant analysis module 121, and input features generated by the merchant aggregate analysis module 122 to train a model and to score new transactions received by the system 100. The model training module 150 may generate a trained model for each set of transactions (and its labels) that is provided by the label generation processor 140. Consequently, the model training module 150 may train multiple separate models based on the labels provided by the label generation processor 140.

In accordance with some embodiments, the model scoring module 160 may take as an input the trained model generated by the model training module 150, input features generated by the account-merchant analysis module 121 and the merchant aggregate analysis module 122, and any new incoming sets of transactions. The model scoring module 160 may score/evaluate transactions that span any period of time such as one day of new transactions. The final output of the model scoring module 160 may comprise scores specifying "recurring" probability of the transactions of the new incoming sets of transactions based on the account-merchant pairs.

Based on the description above, the transaction database 105, the account-merchant analysis module 121, and the merchant aggregate analysis module 122 may form a merchant aggregation pipeline described above. The merchant aggregation pipeline may further comprise the transaction processor 110. Similarly, the transaction database 105, the account-merchant analysis module 121, the merchant aggregate analysis module 122, the feature collector 130, the transaction processor 110, the target label generation processor 140, and the model training module 150 may form a model training pipeline described above. The transaction database 105, the account-merchant analysis module 121, the merchant aggregate analysis module 122, the feature collector 130, the transaction processor 110, the target label generation processor 140, the model training module 150, and the model scoring module 160 may form a model scoring pipeline described above.

The account-merchant analysis module 121, the merchant aggregate analysis module 122, the feature collector 130, the transaction processor 110, the target label generation processor 140, the model training module 150, and the model scoring module 160 may be on a single processor, a multi-core processor, different processors, FPGA, ASIC, and/or DSP. The account-merchant analysis module 121, the merchant aggregate analysis module 122, the feature collector 130, the transaction processor 110, the target label generation processor 140, the model training module 150, and the model scoring module 160 may be implemented as a hardware module or as a software.

Figure 2:
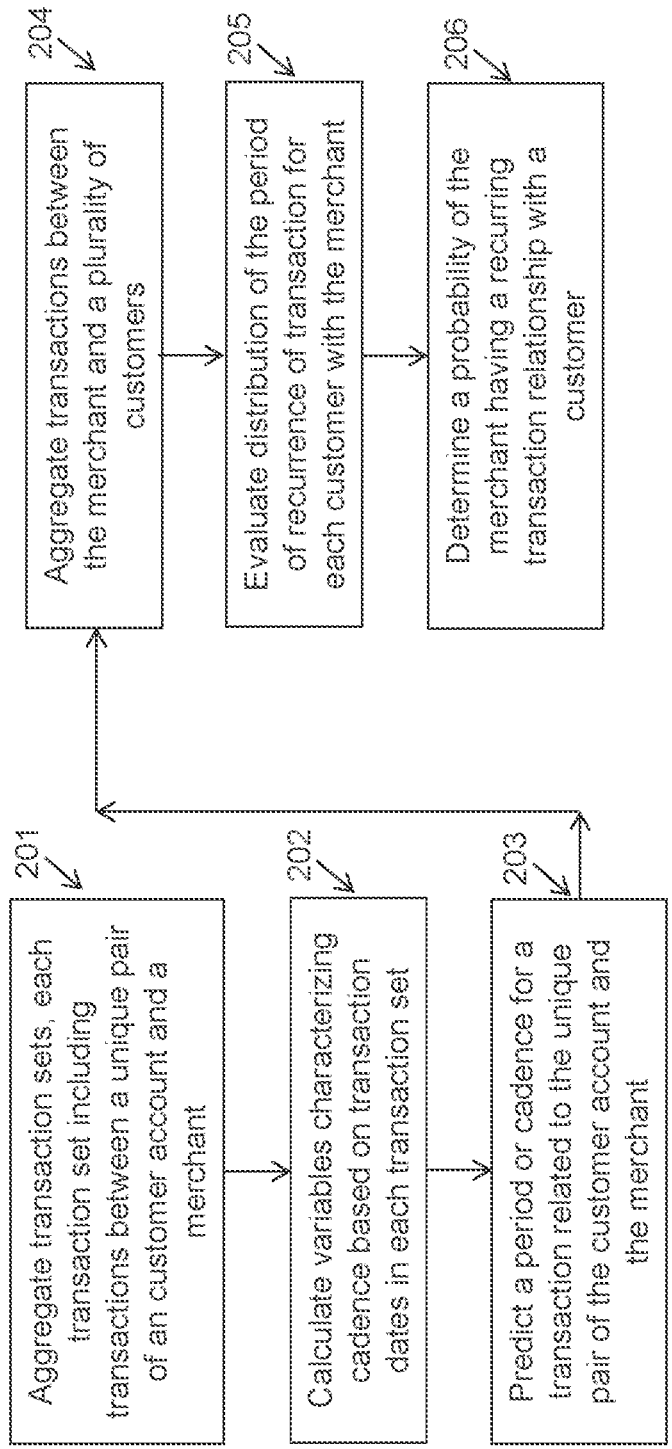
FIG. 2 illustrates a flow chart of steps for generating input variables, in accordance with some embodiments.

FIG. 2 illustrates a flow chart of steps for generating input variables, in accordance with some embodiments. Steps shown in the FIG. 2 may be performed by the system 100 shown in FIG. 1; however, a person skilled in the art may perform these steps by another compatible system. At step 201, transaction sets are aggregated, where each transaction set comprises transactions between a unique pair of a customer account and a merchant. The transactions sets may be aggregated as described above based on information available in various fields of the transaction that uniquely identify a merchant and a customer. The transactions sets may be prepared based on raw transactions or transactions from the analysis portions only if the transactions are split into different analysis and holdout portions.

At step 202, input variable characterizing cadence or recurrence period based on transaction dates in each transaction set may be determined. The input variables determined at step 202 may be basic aggregation variables, cadence analysis variables, and the closest period variables. The basic aggregation variables, the cadence analysis variables, and the closest period variables may be determined as described above by the account-merchant analysis module.

At step 203, as described above, a recurrence period or a cadence may be determined or predicted based on a Euclidean distance between an ideal point (1,1,0) representing a perfect and cleanly recurring series having phase variables—the vector strength with value 1, the coverage with value 1, and the redundancy with value 0—and a mean coordinate point representing a vector strength, a coverage, and a redundancy for a phase space. As described above, the phase space represents a period or a billing cycle. The mean coordinate point is determined for seven different periods—weekly, biweekly, monthly, bimonthly, quarterly, semiannually, and yearly—. The period for which the Euclidean distance between the ideal point and the mean coordinate point is the least is the period over which the transaction set is recurring.

At step 204, transactions may be aggregated between the merchant and the plurality of customers. As described above, information available in various fields of the transaction that uniquely identifies a merchant may be used to aggregate transactions available for all customers and the merchant. At step 205, transactions are processed according to procedures described above for determining phase variables for different phase spaces or periods, for example, weekly, biweekly, monthly, bimonthly, quarterly, semiannually, and yearly. Accordingly, different mean coordinate points, each for a different period of the seven periods, representing the vector strength, the coverage, and the redundancy for each customer may be obtained. The distribution of the closest period variable determined for each customer of the merchant then may be analyzed to determine a probability of the merchant having a recurring transaction relation with its customers at step 206 using the procedures described above.

Figure 3:
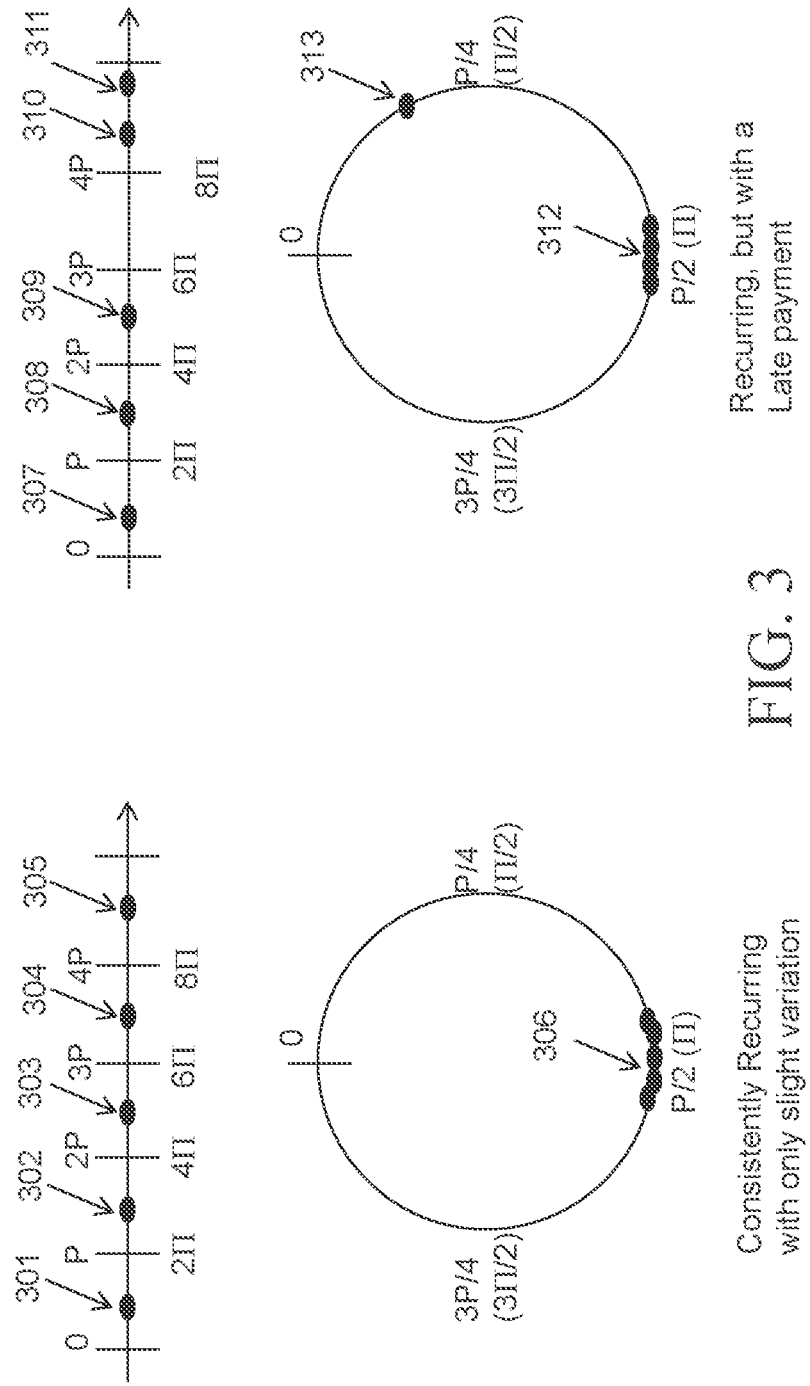
FIG. 3 illustrates charts of transactions plotted on a phase space, in accordance with some embodiments.

FIG. 3 illustrates charts of transactions plotted on a phase space, in accordance with some embodiments. FIG. 3 shows two charts: a first chart that is consistently recurring with only slight variation and a second chart that is recurring but with late payment. The first chart may comprise transactions 301, 302, 303, 304, and 305. The second chart may comprise transactions 307, 308, 309, 310, and 311. Each transaction of the transaction series when plotted on a circular projection, the transactions belonging to the first chart produce a tight cluster 306, whereas the transactions belonging to the second produce a cluster 312 and an isolated transaction 313. Transaction date of transactions 301-305 and 307-311 may be converted into an ordinal transaction date for circular projection on phase space. The phase space, as described above, may be any of the period described above, such as weekly, biweekly, monthly, bimonthly, quarterly, semiannually, and yearly. Subsequently, phase variables vector strength, coverage, and redundancy may be determined as described above.

Figure 4:
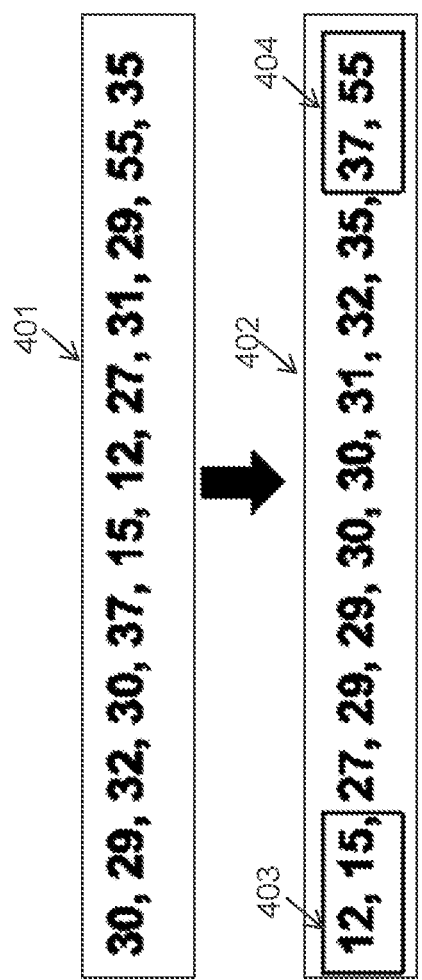
FIG. 4 illustrates transactions, in accordance with some embodiments.

FIG. 4 illustrates transactions, in accordance with some embodiments. As shown in FIG. 4, 401 represents the difference between successive transactions in a series or set of transactions in a number of days. 402 represents a reordering calculated difference between the successive transactions in ascending order. As described above, during the trimmed calculation, transactions within a certain threshold as set according to the requirement from a top 404 and a bottom 403 may be discarded and not considered in the calculation.

Figure 5:
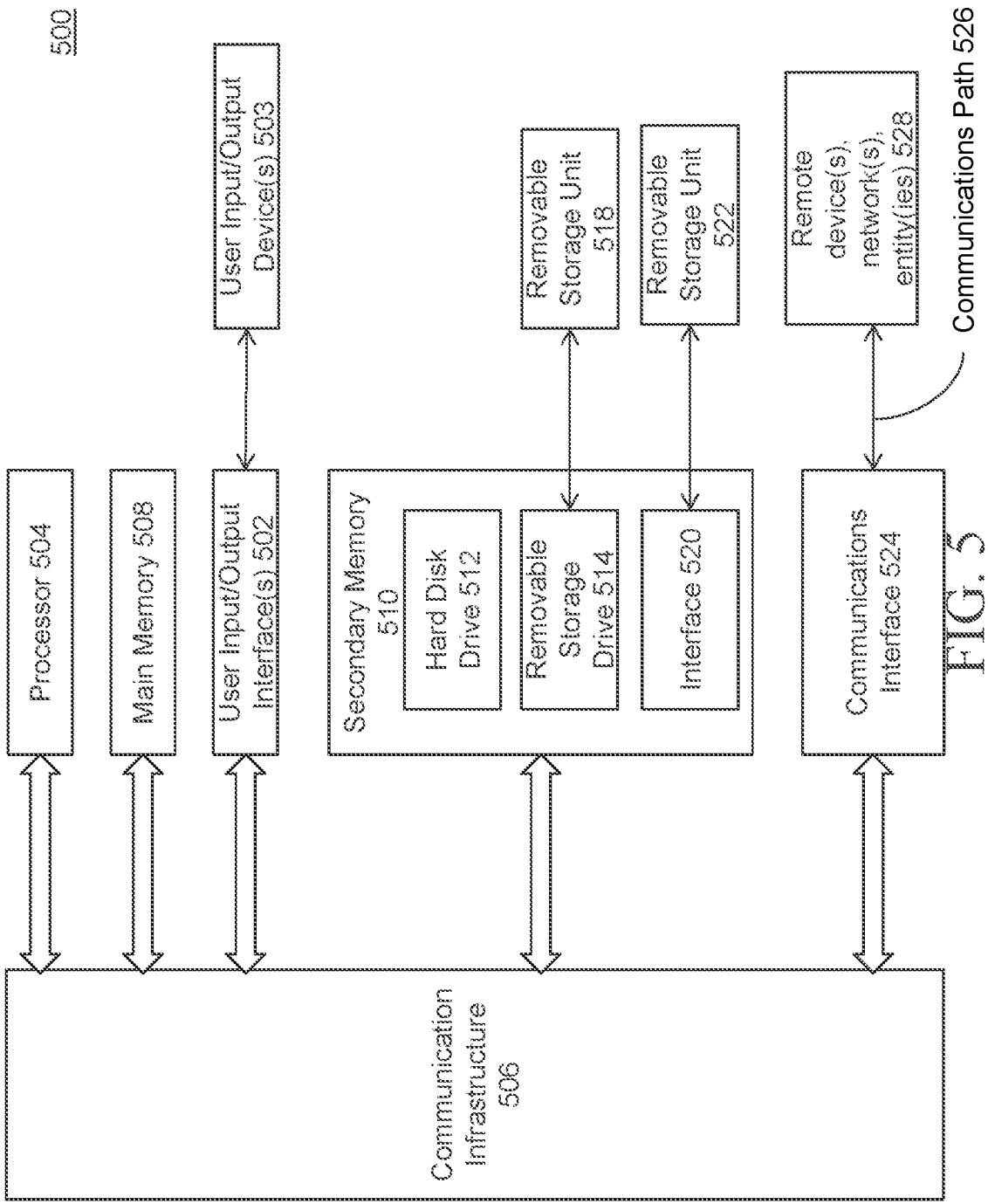
FIG. 5 illustrates an example of a computer system, in accordance with some embodiments.

FIG. 5 depicts an example of a computer system, in accordance with some embodiments.

Various embodiments may be implemented, for example, using one or more well-known computer systems, such as a computer system 500 as shown in FIG. 5. One or more computer systems 500 may be used, for example, to implement any of the embodiments discussed herein, as well as combinations and sub-combinations thereof.

The computer system 500 may include one or more processors (also called central processing units, or CPUs), such as a processor 504. The processor 504 may be connected to a communication infrastructure or bus 506.

The computer system 500 may also include user input/output device(s) 503, such as monitors, keyboards, pointing devices, etc., which may communicate with communication infrastructure 506 through user input/output interface(s) 502.

One or more of processors 504 may be a graphics-processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 500 may also include a main or primary memory 508, such as random access memory (RAM). Main memory 508 may include one or more levels of cache. Main memory 508 may have stored therein control logic (i.e., computer software) and/or data.

The computer system 500 may also include one or more secondary storage devices or memory 510. The secondary memory 510 may include, for example, a hard disk drive 512 and/or a removable storage device or drive 514. The removable storage drive 514 may be a floppy disk drive, a magnetic tape drive, a compact disk drive, an optical storage device, tape backup device, and/or any other storage device/drive.

The removable storage drive 514 may interact with a removable storage unit 518. The removable storage unit 518 may include a computer usable or readable storage device having stored thereon computer software (control logic) and/or data. The removable storage unit 518 may be a floppy disk, magnetic tape, compact disk, DVD, optical storage disk, and/any other computer data storage device. The removable storage drive 514 may read from and/or write to removable storage unit 518.

The secondary memory 510 may include other means, devices, components, instrumentalities or other approaches for allowing computer programs and/or other instructions and/or data to be accessed by the computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 500 may further include a communication or network interface 524. The communication interface 524 may enable the computer system 500 to communicate and interact with any combination of external devices, external networks, external entities, etc. (individually and collectively referenced by reference number 528). For example, the communication interface 524 may allow the computer system 500 to communicate with the external or remote devices 528 over communications path 526, which may be wired and/or wireless (or a combination thereof), and which may include any combination of LANs, WANs, the Internet, etc. Control logic and/or data may be transmitted to and from the computer system 500 via the communication path 526.

The computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

The computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 500, the main memory 508, the secondary memory 510, and the removable storage units 518 and 522, as well as tangible articles of manufacture embodying any combination of the foregoing. Such control logic, when executed by one or more data processing devices (such as the computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

Alternatives

Figure 6:
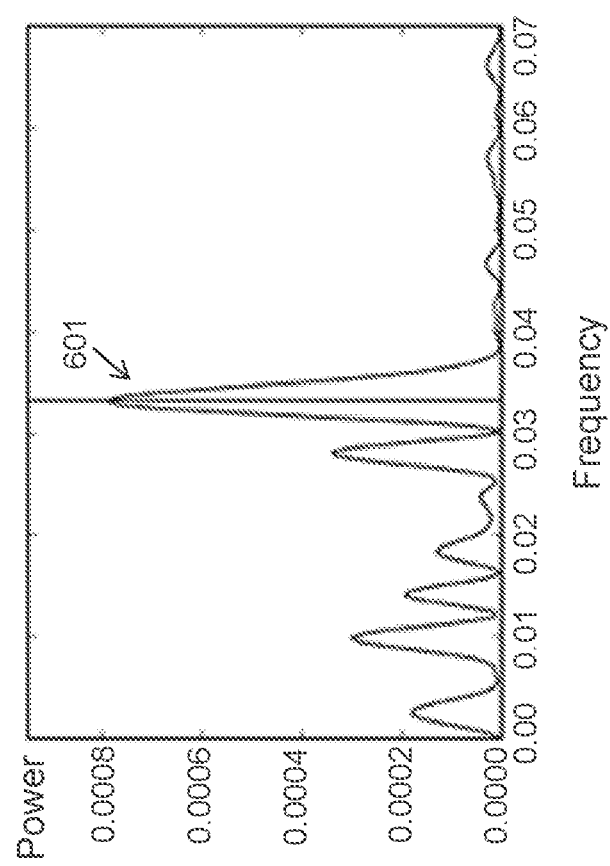
FIG. 6 illustrates a periodogram, in accordance with some embodiments.

Instead of plotting or charting transactions in a transaction series on a circular projection representing a phase space or period to determine cadence analysis variables, the transactions in the transaction series may be analyzed using Fourier analysis. For example, in a transaction series $X_N$ over N days, where each element of the series corresponds to a day, $X_i$ may be set to 1 if a transaction occurs on a day i, and $X_i$ may be set to 0 if the transaction does not occur on a day i. Accordingly, a periodogram, as shown in FIG. 6 may be computed. The periodogram may be defined as:

$$s(f) = \frac{\Delta t}{N} \left| \sum_{n=0}^{N-1} x_n \exp(-i2\pi n \Delta t f) \right|^2$$

The periodogram may also be known as a power spectral density graph. A low pass filter may be applied to reduce high-frequency noise in the periodogram by multiplying S(f) by a Gaussian. In other words, a Gaussian-smoothing kernel may be applied prior to computing the periodogram.

When transactions in a series, which say for example, are recurring at 30 days, the series may produce a peak 601 on the periodogram. Accordingly, a transaction series may be identified as recurring as well as a correct frequency of recurrence period or cadence may be determined without any assumptions.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments but should be defined only in accordance with the following claims and their equivalents.

The claims in the instant application are different from those of the parent application or other related applications. The Applicant, therefore, rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method, comprising:

storing, by an application server, information gathered from a plurality of data sources in a database, the information comprising merchant identification information of a plurality of merchants and a plurality of transactions of a plurality of customer accounts is gathered for categorizing a transaction recurrency between a merchant of the plurality of merchants and customer account of the plurality of customer accounts;

aggregating, by the application server, a plurality of sets of transactions based on the gathered information stored in the database, each set of transactions is related to an account-merchant pairing, wherein the account-merchant pairing includes a customer account the plurality of customer accounts and a merchant of the plurality of merchants;

splitting each set of the transactions into a plurality of first subset of transactions and corresponding second subset of transactions for generating expanded test data sets, wherein transactions are split based on a split date;

training a machine learning algorithm by using target label variables, the target label variables are generated based on the second subset of transactions according to predicted transaction dates in the second subset of transactions of the corresponding first subset of transactions of the expanded test data sets and predetermined matching criteria for training a machine learning algorithm, wherein the target label variables identify recurrency of transactions in the first subset of transactions, wherein the matching criteria comprises a number of predictions and a date tolerance, and wherein the predicted transaction dates in the second subset of transactions within the date tolerance are at least the number of predictions in the matching criteria;

converting, by the application server, transactions dates of the transactions in each first subset of transactions into ordinal dates;

mapping, by the application server, the ordinal dates into a phase space, wherein the phase space represents a billing cycle;

determining, by the application server, a mean coordinate based on the mapped ordinal dates;

determining, by the application server, a vector strength, a coverage, and a redundancy, wherein the vector strength, the coverage, and the redundancy are phase variables characterizing a recurrence period;

predicting, by the application server, the recurrence period for a transaction related to the account-merchant pairing for each customer of the plurality of customers;

aggregating, by the application server, another set of transactions between the plurality of customers and the merchant, wherein the another set of transactions comprises transactions in the plurality of sets of transactions;

evaluating, by the application server, a distribution of the recurrence period for each customer based on a plurality of multi-dimensional distribution points representing the recurrence period within a range of a point representing predetermined values of the vector strength, the coverage, and the redundancy; and based on the evaluation of the distribution of the recurrence period for each customer, generating, by the application server, a probability of the merchant having a recurrent transaction with the customer account using the trained machine learning algorithm based on the generated target label variables.

2. The method of claim 1, wherein the first subset of transactions are used as a training subset and determined based on occurring prior to the split date and the second subset of transactions are used as a testing subset and determined based on occurring after the split date.

3. The method of claim 1, further comprising:
determining a standard deviation of difference between the transaction dates of the transactions in each first subset of transactions;
determining an average difference between the transaction dates of the transactions in each first subset of transactions; and
determining a ratio between the standard deviation of difference between the transaction dates and the average difference between the transaction dates,
wherein the standard deviation of the transaction dates, the average difference between the transaction dates, and the ratio of the standard deviation of the transaction dates to the average difference between the transaction dates are delta time variables characterizing the recurrence period.

4. The method of claim 1,
wherein the vector strength is a distance between a (0,0) coordinate of a unit circle and the mean coordinate,
wherein the coverage is a count of billing cycles in the phase space having at least one transaction, and
wherein the redundancy is a percentage of billing cycles having more than one transaction.

5. The method of claim 1, further comprising determining a modified vector strength as $$r_{adjusted} = 1 - \frac{2}{\pi}\arccos(r),$$

wherein $r_{adjusted}$ is the modified vector strength and r is the vector strength.

6. The method of claim 1, further comprising determining a probability of the transactions in each first subset of transactions for the recurrence period based on a Euclidean distance between the point representing the predetermined values of the vector strength, the coverage, and the redundancy and another point representing another value of the vector strength, the coverage, and the redundancy as (the vector strength, the coverage, the redundancy) for phase spaces, wherein each distance between phase variable coordinates corresponds to one of a weekly, a biweekly, a monthly, a bimonthly, a quarterly, a semi-annually, and a yearly period.

7. The method of claim 1, wherein aggregating the plurality of sets of transactions with each set of transactions comprising transactions related to the account-merchant pairing comprises:
ordering the transactions in a chronological order; and
discarding transactions at a beginning and at an end of the chronologically ordered transactions within a user specified threshold value.

8. The method of claim 1, wherein the machine learning algorithm is a supervised machine learning algorithm.

9. A system, comprising:
a memory for storing instructions; and
a processor, communicatively coupled to the memory, configured to execute the instructions, the instructions causing the processor to:
store information gathered from a plurality of data sources in a database, the information comprising merchant identification information of a plurality of merchants and a plurality of transactions of a plurality of customer accounts is gathered for categorizing a transaction recurrency between a merchant of the plurality of merchants and customer account of the plurality of customer accounts;
aggregate a plurality of sets of transactions based on the gathered information stored in the database, each set of transactions is related to an account-merchant pairing, wherein the account-merchant pairing includes a customer account of the plurality of customer accounts and a merchant of the plurality of merchants;
split each set of the transactions into a plurality of first subset of transactions and corresponding second subset of transactions for generating expanded test data sets, wherein transactions are split based on a split date;
train a machine learning algorithm by using target label variables, the target label variables are generated based on the second subset of transactions according to predicted transaction dates in the second subset of transactions of the corresponding first subset of transactions of the expanded test data sets and predetermined matching criteria for training a machine learning algorithm, wherein the target label variables identify recurrency of transactions in the first subset of transactions, wherein the matching criteria comprises a number of predictions and a date tolerance, and wherein the predicted transaction dates in the second subset of transactions within the date tolerance are at least the number of predictions in the matching criteria;
convert transactions dates of the transactions in each first subset of transactions into ordinal dates;
map the ordinal dates into a phase space, wherein the phase space represents a billing cycle;
determine a mean coordinate based on the mapped ordinal dates;
determine a vector strength, a coverage, and a redundancy, wherein the vector strength, the coverage, and the redundancy are phase variables characterizing a recurrence period;
predict the recurrence period for a transaction related to the account-merchant pairing for each customer of the plurality of customers;
aggregate another set of transactions between the plurality of customers and the merchant, wherein the another set of transactions comprises transactions in the plurality of sets of transactions;
evaluate a distribution of the recurrence period for each customer based on a plurality of multi-dimensional distribution points representing the recurrence period within a range of a point representing predetermined values of the vector strength, the coverage, and the redundancy; and
based on the evaluation of the distribution of the recurrence period for each customer, generating a probability and a recurrence period of the merchant having a recurrent transaction with the customer account using the trained machine learning algorithm based on the generated target label variables.

10. The system of claim 9, wherein the first subset of transactions are used as a training subset and determined based on occurring prior to the split date and the second subset of transactions are used as a testing subset and determined based on occurring after the split date.

11. The system of claim 9, wherein the processor is further configured to:
   determine a standard deviation of difference between the transaction dates of the transactions in each first subset of transactions;
   determine an average difference between the transaction dates of the transactions in each first subset of transactions; and
   determine a ratio between the standard deviation of the difference between transaction dates and the average difference between the transaction dates,
   wherein the standard deviation of the transaction dates, the average difference between the transaction dates, and the ratio of the standard deviation of the transaction dates to the average difference between the transaction dates are delta time variables characterizing the recurrence period.

12. The system of claim 9, wherein the vector strength is a distance between a (0,0) coordinate and the mean coordinate,
   wherein the coverage is a count of billing cycles in the phase space having at least one transaction, and
   wherein the redundancy is a percentage of billing cycles having more than one transaction.

13. The system of claim 9, wherein the processor is further configured to:
   determine a modified vector strength as $$r_{adjusted} = 1 - \frac{2}{\pi}\arccos(r),$$

wherein $r_{adjusted}$ is the modified vector strength and r is the vector strength.

14. The system of claim 9, wherein the processor is further configured to:
   determine a probability of the transactions in each first subset of transactions for the recurrence period based on a Euclidean distance between the point representing the predetermined values of the vector strength, the coverage, and the redundancy and another point representing another value of the vector strength, the coverage, and the redundancy as (the vector strength, the coverage, the redundancy) for phase spaces, wherein each distance between phase variable coordinates corresponds to one of a weekly, a biweekly, a monthly, a bimonthly, a quarterly, a semi-annually, and a yearly period.

15. The system of claim 9, wherein to aggregate the plurality of sets of transactions with the each set of transactions comprising transactions related to the account-merchant pairing, the processor is further configured to:
   order the transactions in a chronological order; and
   discard transactions at a beginning and at an end of the chronologically ordered transactions within a user specified threshold value.

16. The system of claim 9, wherein the machine learning algorithm is a supervised machine learning algorithm.

17. A non-transitory, tangible computer-readable device having instructions stored thereon that, when executed by at least one computing device, causes the at least one computing device to perform operations comprising:
   storing information gathered from a plurality of data sources in a database, the information comprising merchant identification information of a plurality of merchants and a plurality of transactions of a plurality of customer accounts is gathered for categorizing a transaction recurrency between a merchant of the plurality of merchants and customer account of the plurality of customer accounts;
   aggregating a plurality of sets of transactions based on the gathered information stored in the database, each set of transactions is related to an account-merchant pairing, wherein the account-merchant pairing includes a customer account of the plurality of customer accounts and a merchant of the plurality of merchants;
   splitting each set of the transactions into a plurality of first subset of transactions and corresponding second subset of transactions for generating expanded test data sets, wherein transactions are split based on a split date;
   training a machine learning algorithm by using target label variables, the target label variables are generated based on the second subset of transactions according to predicted transaction dates in the second subset of transactions of the corresponding first subset of transactions of the expanded test data sets and predetermined matching criteria for training a machine learning algorithm, wherein the target label variables identify recurrency of transactions in the first subset of transactions, wherein the matching criteria comprises a number of predictions and a date tolerance, and wherein the predicted transaction dates in the second subset of transactions within the date tolerance are at least the number of predictions in the matching criteria;
   converting transactions dates of the transactions in each first subset of transactions into ordinal dates;
   mapping the ordinal dates onto phase spaces, wherein each phase space of the phase spaces corresponds to one of a weekly, a biweekly, a monthly, a bimonthly, a quarterly, a semi-annually, and a yearly period;
   determining a mean coordinate based on the mapped ordinal dates;
   determining a vector strength, a coverage, and a redundancy, wherein the vector strength, the coverage, and the redundancy are phase variables characterizing a recurrence period;
   predicting the recurrence period for a transaction related to the account-merchant pairing for each customer of the plurality of customers;
   aggregating another set of transactions between the plurality of customers and the merchant, wherein the another set of transactions comprises transactions in the plurality of sets of transactions;
   evaluating a distribution of the recurrence period for each customer based on a plurality of multi-dimensional distribution points representing the recurrence period within a range of a point representing predetermined values of the vector strength, the coverage, and the redundancy; and
   based on the evaluation of the distribution of the recurrence period for each customer, generating a probability and the recurrence period of the merchant having a recurrent transaction with the customer account using the trained machine learning algorithm based on the generated target label variables.

18. The non-transitory, tangible computer-readable device of claim 17, wherein the operations further comprise:
   determining a standard deviation of difference between the transaction dates of the transactions in each first subset of transactions;

determining an average difference between the transaction dates of the transactions in each first subset of transactions; and determining a ratio between the standard deviation of the transaction dates and the average difference between the transaction dates, wherein the standard deviation of the difference between the transaction dates, the average difference between the transaction dates, and the ratio of the standard deviation of the transaction dates to the average difference between the transaction dates are delta time variables characterizing the recurrence period.

19. The non-transitory, tangible computer-readable device of claim 17, wherein the operations further comprise:

ordering the transactions in a chronological order; and discarding transactions at a beginning and at an end of the chronologically ordered transactions within a user specified threshold value, wherein the vector strength is a distance between a (0,0) coordinate and the mean coordinate, wherein the coverage is a count of billing cycles in the phase space having at least one transaction, and wherein the redundancy is a percentage of billing cycles having more than one transaction.

20. The non-transitory, tangible computer-readable device of claim 17, wherein the operations further comprise:

determining a modified vector strength as $$r_{adjusted} = 1 - \frac{2}{\pi}\arccos(r),$$

wherein $r_{adjusted}$ is the modified vector strength and r is the vector strength.

* * * * *